United States Patent
Saga et al.

[19]

[11] Patent Number: 5,927,829
[45] Date of Patent: Jul. 27, 1999

[54] BRAKE APPARATUS FOR ELECTRIC AUTOMOBILE UTILIZING REGENERATIVE BRAKING

[75] Inventors: Kenichi Saga, Nagoya; Hiroaki Yoshida, Okazaki; Akira Maeda, Nagoya, all of Japan

[73] Assignee: Mitsubishi Jidosha Kogyo Kabushiki Kaisha, Tokyo, Japan

[21] Appl. No.: 08/720,870

[22] Filed: Oct. 3, 1996

[30] Foreign Application Priority Data

Oct. 3, 1995 [JP] Japan .................................. 7-256661
Apr. 22, 1996 [JP] Japan .................................. 8-099763

[51] Int. Cl.$^6$ ...................................................... B60L 7/22
[52] U.S. Cl. .......................................... 303/152; 180/165
[58] Field of Search ............................ 303/3, 15, 115.2, 303/113.2, 152; 180/65.1–65.5, 165

[56] References Cited

U.S. PATENT DOCUMENTS 5,326,158  7/1994  Ohori et al. ................................ 303/15
5,568,962  10/1996  Enomoto et al. ........................ 303/152
5,632,534  5/1997  Knechtges ................................ 303/152

FOREIGN PATENT DOCUMENTS 59-230856  12/1984  Japan .
1126103  5/1989  Japan .
4355603  12/1992  Japan .

*Primary Examiner*—Matthew C. Graham

[57] ABSTRACT

A brake apparatus for an electric automobile applies brakes to the vehicle to achieve a required amount of braking force by combining regenerative braking force of an electric motor with mechanical braking force produced by a mechanical braking system. The braking force required by a driver is obtained from the depression force applied to a brake pedal, and the maximum regenerative braking force, that can be generated by the motor, is obtained from the rotation speed of the motor. The target mechanical braking force is calculated based on the required braking force and the maximum regenerative braking force. By suitably controlling the pneumatic pressure applied to a booster device provided in the mechanical brake system, the fluid pressure actually applied to brake actuating members is controlled to provide the target mechanical braking force.

13 Claims, 22 Drawing Sheets

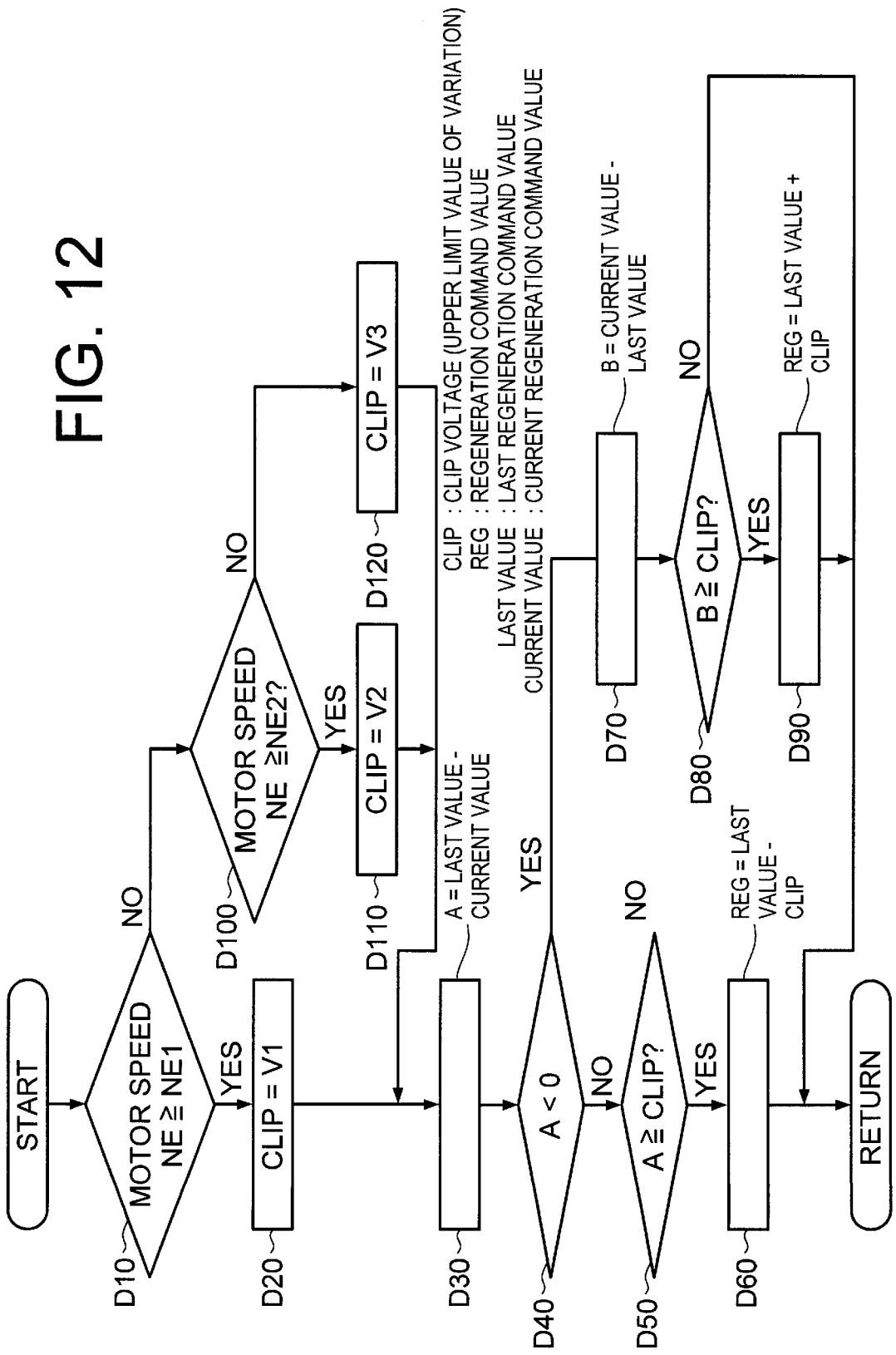

FIG. 15

| SR | M | V_COUNT |
|---|---|---|
| 1 (PRESSURE INCREASE) | 0.8 ~ 1.0 | 10 |
| | 0.7 ~ 0.8 | 8 |
| | 0.6 ~ 0.7 | 7 |
| | 0.5 ~ 0.6 | 6 |
| | 0.4 ~ 0.5 | 5 |
| | 0.3 ~ 0.4 | 4 |
| | 0.2 ~ 0.3 | 3 |
| | 0.1 ~ 0.2 | 2 |
| 2 (PRESSURE REDUCTION) | -0.1 ~ -0.2 | 2 |
| | -0.2 ~ -0.3 | 3 |
| | -0.3 ~ -0.4 | 4 |
| | -0.4 ~ -0.5 | 5 |
| | -0.5 ~ -0.6 | 6 |
| | -0.6 ~ -0.7 | 7 |
| | -0.7 ~ -0.8 | 8 |
| | -0.8 ~ -1.0 | 10 |

FIG. 18

| MODE | FIRST EMV 19 | SECOND EMV 20 | THIRD EMV 21 |
|---|---|---|---|
| INCREASE | ON | OFF | ON |
| REDUCTION | ON | ON | OFF |
| HOLD | ON | OFF | OFF |
| STOP | ON | ON | OFF |
| INHIBIT | OFF | OFF | OFF |

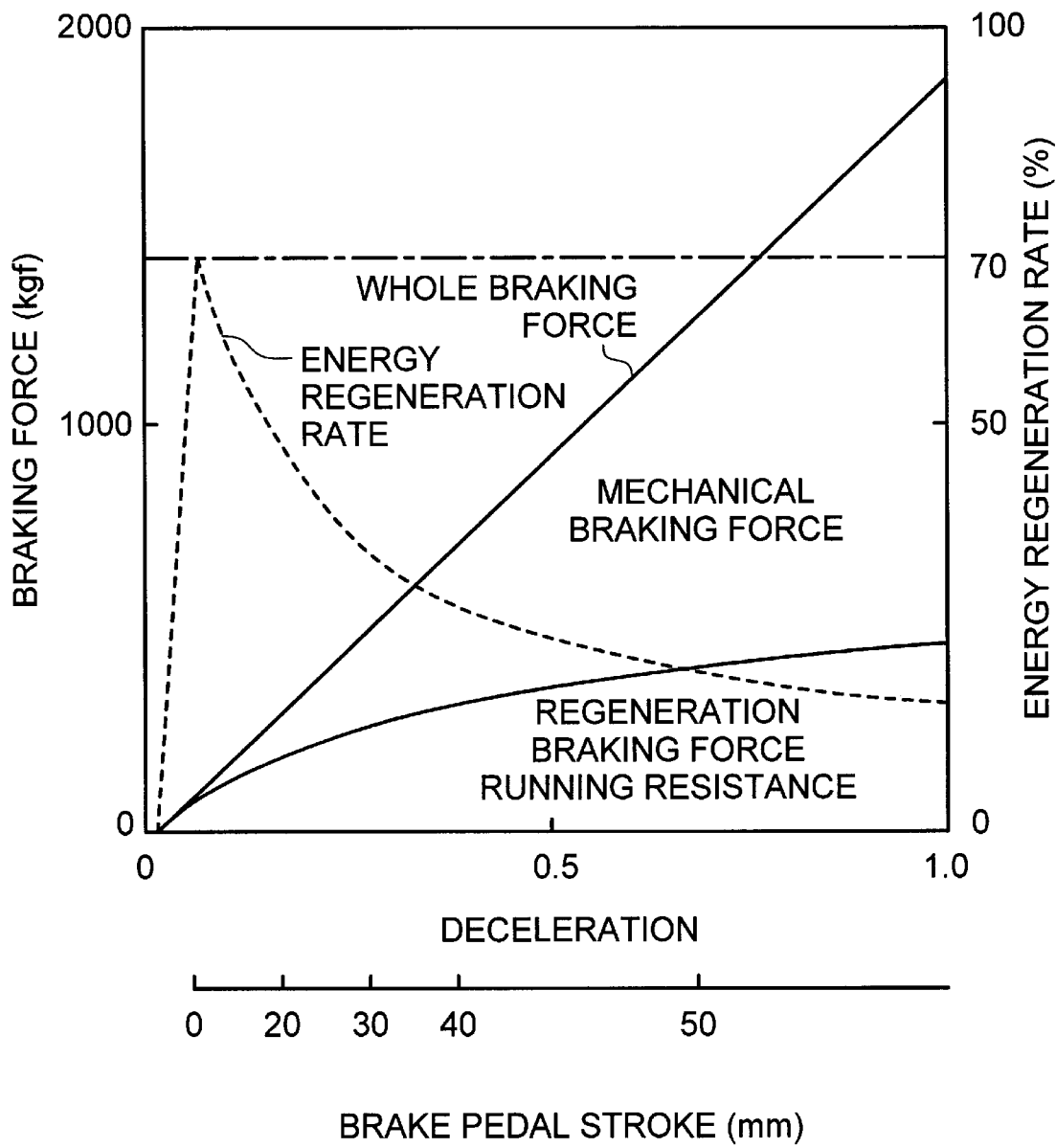

BRAKE APPARATUS FOR ELECTRIC AUTOMOBILE UTILIZING REGENERATIVE BRAKING

BACKGROUND OF THE INVENTION

1. Field of the Invention

The present invention relates to a brake apparatus for an electric automobile, which applies brakes to the vehicle that utilizes braking force produced by energy regeneration of an electric motor along with braking force applied to the vehicle by an ordinary mechanical braking, such that a required amount of braking force can be obtained by appropriately combining the braking force produced by energy regeneration with the braking force of mechanical braking.

2. Description of Related Art

In recent years, electric automobiles using electric motors for driving vehicle wheels have attracted increasing attentions or interests from the viewpoint of control of air pollution and reduction of noise generated by motor vehicles. Such an electric automobile (hereinafter referred to as vehicle when appropriate) may utilize so-called regenerative braking. To effect the regenerative braking, the electric motor for running the vehicle is placed in a power-generating state by regulating or limiting supply of electric power to the electric motor, so that rotary motion of drive wheels connected to the electric motor is converted into electric energy, and thus recovered, i.e., reused as driving force. The conversion of the rotary motion of the drive wheels into the electric energy involves consumption of kinetic energy, which is considered equivalent to braking of the drive wheels.

The above-described brake apparatus is controlled to start regenerative braking when a driver releases his/her foot from an accelerator pedal of the vehicle. If a brake pedal is not depressed when the accelerator pedal released, the extent of regenerative braking corresponds to engine braking performed by a conventional automobile driven by an internal combustion engine, for example. In this case, the brake apparatus is controlled to perform a weak regenerative braking. If the brake pedal is depressed, the brake apparatus is generally controlled to generate regenerative braking force in accordance with a degree or depth of depression of the brake pedal.

FIG. 20 shows the construction of the most basic example of a brake apparatus for an electric automobile utilizing regenerative braking. Reference numeral 011 denotes a brake pedal, and 012 denotes a vacuum type booster (vacuum booster device or assistor) that constitutes a mechanical brake system. The vacuum type booster 012 is actuated according to the depression depth (stroke) of the brake pedal 011. Vacuum tank 013 for supplying vacuum is connected to the vacuum type booster 012, and the vacuum tank 013 is equipped with a pump motor 014 for reducing the pressure within the tank 013.

In the mechanical brake system as described above, brake operating force (depression force) generated by the vacuum type booster 012 is converted into a brake fluid pressure in a master cylinder (not shown), and the brake fluid pressure is applied to brake actuating members (e.g., brake calipers) on the side of drive wheels, so that the brake actuating members are actuated to apply mechanical brake force to the drive wheels.

In FIG. 20, reference numeral 015 denotes a motor controller for controlling a motor 002 used to run the vehicle, and the pump motor 014. Upon regenerative braking, the motor controller 015 generates a regeneration command to the motor 002 to switch the motor 002 to the power-generating state, so that a load (i.e., braking force) is applied to the drive wheels, and rotary motion of the drive wheels is recovered as electric energy, which is in turn charged in a battery (not shown). When the brake pedal 011 is depressed, the motor controller 014 performs regeneration control by setting a regeneration command value on the basis of information detected by a brake stroke sensor 016 adapted to detect a degree of depression of the brake pedal 011.

In a general mechanical brake system, mechanical braking force is determined exclusively according to the operated state of the brake pedal 011. Although the mechanical braking force does not necessarily increase linearly with respect to the amount (stroke) of depression of the brake pedal 011, the mechanical braking force increases in some fashion with the increase in the depression stroke of the pedal 011.

In the electric automobile, a sum of the above mechanical braking force and the braking force (regenerative braking force), which is obtained by the above-described regenerative braking, is applied to the vehicle. Desirably, the total braking force (mechanical braking force+regenerative braking force) applied to the vehicle increases linearly or approximately linearly with respect to the depression stroke of the brake pedal 011, as shown in FIG. 21. Otherwise, the brake feeling will be deteriorated.

Since, the mechanical braking force is determined solely based on the brake-pedal depression stroke, as described above, the regenerative braking force will naturally be determined once a desired increasing characteristic of the total braking force is determined.

On the other hand, the braking force (maximum regenerative force) that can be generated as the regenerative force depends upon the rotation speed of the electric motor, irrespective of the brake-pedal depression stroke. Accordingly, where the depression stroke is small and a required amount of the total braking force is small, the regenerative braking force can be used to provide most of the total braking force, namely, the ratio of the regenerative braking force to the whole braking force can be considerably large.

In the brake apparatus utilizing regenerative braking along with mechanical braking, however, the mechanical braking force is generated even where the regenerative braking force can provide most of the required braking force. Therefore, the rotary motion of drive wheels, which would be otherwise recovered as electric energy through regenerative braking, is undesirably dissipated as thermal energy due to actuation of the mechanical brake system, and the energy recovery rate is limited as shown in FIG. 21, thereby causing a problem that the regenerative braking force cannot be efficiently recovered as the electric energy.

To solve the above problem, there has been proposed a brake apparatus utilizing regenerative braking as well as mechanical braking as disclosed in laid-open Publication (kokai) No. 59-230856 of Japanese Patent Application. In the apparatus disclosed therein, a difference between the braking force required by a driver, which is calculated based on the force (depression force) exerted on the brake pedal (depression force signal), and the regenerative braking force that varies with the rotation speed of the motor is calculated by subtracting the regenerating braking force from the required braking force, and the obtained difference is compared with the mechanical braking force (brake fluid pressure) generated upon depression of the brake pedal to control a pressure-regulating device provided in a brake circuit, thereby to regulate the pressure applied to the brake actuating members.

More specifically, if the above-mentioned difference is larger than the brake fluid pressure, this fluid pressure is increased to increase the insufficient mechanical braking force so that the total braking force reaches the required level. If the above difference is smaller than the brake fluid pressure, on the other hand, the excessive mechanical braking force is reduced so that the maximum regenerative braking force can be utilized.

With the brake apparatus thus constructed, the regenerative braking force can be efficiently recovered as the electric energy even where the brake-pedal depression stroke is small.

Other brake apparatus utilizing regenerative braking, which are constructed technically similar to that disclosed in the above-identified publication, are also disclosed in laid-open Publications Nos. 1-126103 and 4-355603 of Japanese Patent Applications.

In the known brake apparatus as described above, however, the mechanical brake force is controlled by controlling the brake fluid pressure itself, which is eventually applied to the brake actuating members of the vehicle wheels, in order to increase the energy recovery rate by the regenerative braking force. In this case, a considerably high-level technique is required for controlling the brake fluid pressure, thus making it difficult to maintain good brake feeling. In the case where any failure occurs in control valves for controlling the brake fluid pressure, in particular, the mechanical brake may fail to operate.

SUMMARY OF THE INVENTION

The present invention has been developed in view of the above-described problems. It is, therefore, an object of the invention to provide a brake apparatus utilizing regenerative braking as well as mechanical braking wherein regenerating braking force can be utilized to recover electric energy with improved efficiency, assuring good braking feeling and increased safety.

The above object may be accomplished according to the principle of the present invention, which provides a brake apparatus utilizing regenerative braking as well as mechanical braking, for use in an electric automobile having an electric motor driven by a battery installed in the automobile, comprising: a mechanical brake system including a master cylinder for converting depression force applied to a brake pedal provided in the electric automobile into a fluid pressure, through a booster device for amplifying the depression force with a pneumatic pressure, and a brake actuating member provided in each of vehicle wheels of the automobile, for receiving the fluid pressure generated by the master cylinder and applying a mechanical braking force to the each vehicle wheel; regenerative braking force calculating means for calculating a maximum regenerative braking force based on a rotation speed of the electric motor; a regenerative brake system for generating a regenerative braking force to the electric motor, based on a result of calculation of the regenerative braking force calculating means; brake pedal operation detecting means for detecting an operated state of the brake pedal; required braking force calculating means for calculating a required braking force required by a driver, based on the operated state of the brake pedal detected by the brake pedal operation detecting means; target mechanical braking force calculating means for calculating a target mechanical braking force to be generated by the mechanical brake system, based on the required braking force calculated by the required braking force calculating means, and the maximum regenerative braking force calculated by the regenerative braking force calculating means; and mechanical braking force control means for controlling the pneumatic pressure applied to the booster device so that the fluid pressure generated by the master cylinder provides the target mechanical braking force calculated by the target mechanical braking force calculating means.

In the brake apparatus constructed as described above, the electric energy can be more efficiently recovered utilizing the regenerative braking force, assuring good brake feeling. Even if a failure or defect occurs in the mechanical braking force control means for controlling the pneumatic pressure applied to the booster device, only the boosting capability is affected or limited, permitting the mechanical brake system to fulfill its normal function, thus assuring improved operating safety.

Further, a conventional brake system having a booster, which is usually used in an automobile equipped with an internal combustion engine, can be used as the mechanical brake system to reduce the cost of the system.

The mechanical braking force control means may control the pneumatic pressure applied to the booster device, according to a difference between the target mechanical braking force obtained by the target mechanical braking force calculating means and an actual mechanical braking force actually generated by the mechanical brake system. In this arrangement, the mechanical braking force can be adjusted with further improved accuracy.

The regenerative braking force calculating means may be constructed to calculate the maximum regenerative braking force based on a control map representing a predetermined relationship between the maximum regenerative braking force and the rotation speed of the electric motor. This makes it easier to calculate the maximum regenerative braking force, and simplifies a control circuit that provides the regenerative braking force calculating means.

A variation per unit time of a value that corresponds to the maximum regenerative braking force obtained by the regenerative braking force calculating means may be compared with a predetermined variation limiting threshold value, and the maximum regenerative braking force may be compensated based on the variation limiting threshold value to provide a compensated value to be supplied to the target mechanical braking force calculating means when the variation exceeds the variation limiting threshold value, so that the target mechanical braking force calculating means calculates the target mechanical braking force to be generated by the mechanical brake system, based on the required braking force calculated by the required braking force calculating means and the compensated value of the maximum regenerative braking force. In this arrangement, the variation in the regenerative braking force actually generated by the electric motor is limited even if the maximum regenerative braking force is rapidly changed. Accordingly, vibrations of the electric motor due to changes in the regenerative braking force, variations of the mechanical braking force due to changes of the regenerative braking force, and rapid changes of control due to control delay or others can be avoided, thereby assuring good braking feeling.

The brake apparatus may further comprise regeneration command value calculating means for producing a regeneration command value to be fed to the electric motor, based on the maximum regenerative braking force obtained by the regenerative braking force calculating means, and regenerative command value limiting means for comparing a variation per unit time of the regeneration command value produced by the regeneration command value calculating means with a predetermined variation limiting threshold value, and outputting a regeneration command compensated value obtained by compensating the regenerative command value based on the variation limiting threshold value when the variation exceeds the variation limiting threshold value, while outputting the regenerating command value as it is as the regeneration command compensated value when the variation is not greater than the variation limiting threshold value. In this case, the target mechanical braking force calculating means calculates the target mechanical braking force to be generated by the mechanical brake system, based on the required braking force calculated by the required braking force calculating means, and the regeneration command compensated value outputted by the regeneration command value limiting means.

In the above case, the regenerative command limiting means may add or subtract the variation limiting threshold value to or from the regeneration command value, depending upon a direction of the variation in the regenerative command value, when the variation per unit time in the regeneration command value obtained by the regeneration command value calculating means exceeds the predetermined variation limiting threshold value. In this arrangement, too, variations in the regenerative braking force actually generated by the electric motor can be limited, and vibrations of the electric motor due to changes in the regenerative braking force, variations of the mechanical braking force due to changes of the regenerative braking force, and rapid changes of control due to control delay or others can be avoided, thereby assuring good braking feeling.

The above-indicated variation limiting threshold value may vary with the rotation speed of the electric motor. In this case, rapid changes of control can be suppressed with more accuracy.

There is also provided the brake apparatus utilizing regenerative braking as well as mechanical braking, for use in an electric automobile having an electric motor driven by a battery installed in the automobile, comprising: a mechanical brake system including a master cylinder for converting depression force applied to a brake pedal provided in the electric automobile into a fluid pressure, and a brake actuating member for receiving the fluid pressure generated by the master cylinder and applying a mechanical braking force to each of vehicle wheels of the automobile; regenerative braking force calculating means for calculating a maximum regenerative braking force based on a rotation speed of the electric motor; a regenerative brake system for generating a regenerative braking force to the electric motor, based on a result of calculation of the regenerative braking force calculating means; brake pedal operation detecting means for detecting an operated state of the brake pedal; required braking force calculating means for calculating a required braking force required by a driver, based on the operated state of the brake pedal detected by the brake pedal operation detecting means; target mechanical braking force calculating means for calculating a target mechanical braking force to be generated by the mechanical brake system, based on the required braking force calculated by the required braking force calculating means, and a compensated value of the maximum regenerative braking force, the compensated value being obtained by compensating the maximum regenerative braking force calculated by the regenerative braking force calculating means based on a predetermined variation limiting threshold value when a variation per unit time of a value that corresponds to the maximum regenerative braking force exceeds the predetermined variation limiting threshold value, the maximum regenerative braking force being outputted as it is as the compensated value when the maximum regenerative braking force is not greater than the predetermined variation limiting threshold value; and mechanical braking force control means for controlling the mechanical brake system so that the fluid pressure generated by the master cylinder provides the target mechanical braking force calculated by the mechanical braking force calculating means.

In this arrangement, too, variations in the regenerative braking force actually generated by the electric motor can be limited even if the maximum regenerative braking force is rapidly changed, and vibrations of the electric motor due to changes in the regenerative braking force, variations of the mechanical braking force due to changes of the regenerative braking force, and rapid changes of control due to control delay or others can be avoided, thereby assuring good braking feeling.

BRIEF DESCRIPTION OF THE DRAWINGS

FIG. 12 is a flow chart showing control for limiting a regeneration command value in the brake apparatus of the present embodiment;

FIG. 15 is a table related to the duty value of the electromagnetic valves of the booster device of the present embodiment;

FIG. 18 is a table showing contents of the drive control of the electromagnetic valves of the booster device of the present embodiment;

FIG. 21 is a graph showing braking force characteristics of the conventional brake apparatus for the electric automobile.

DESCRIPTION OF THE PREFERRED EMBODIMENT

Figure 1:
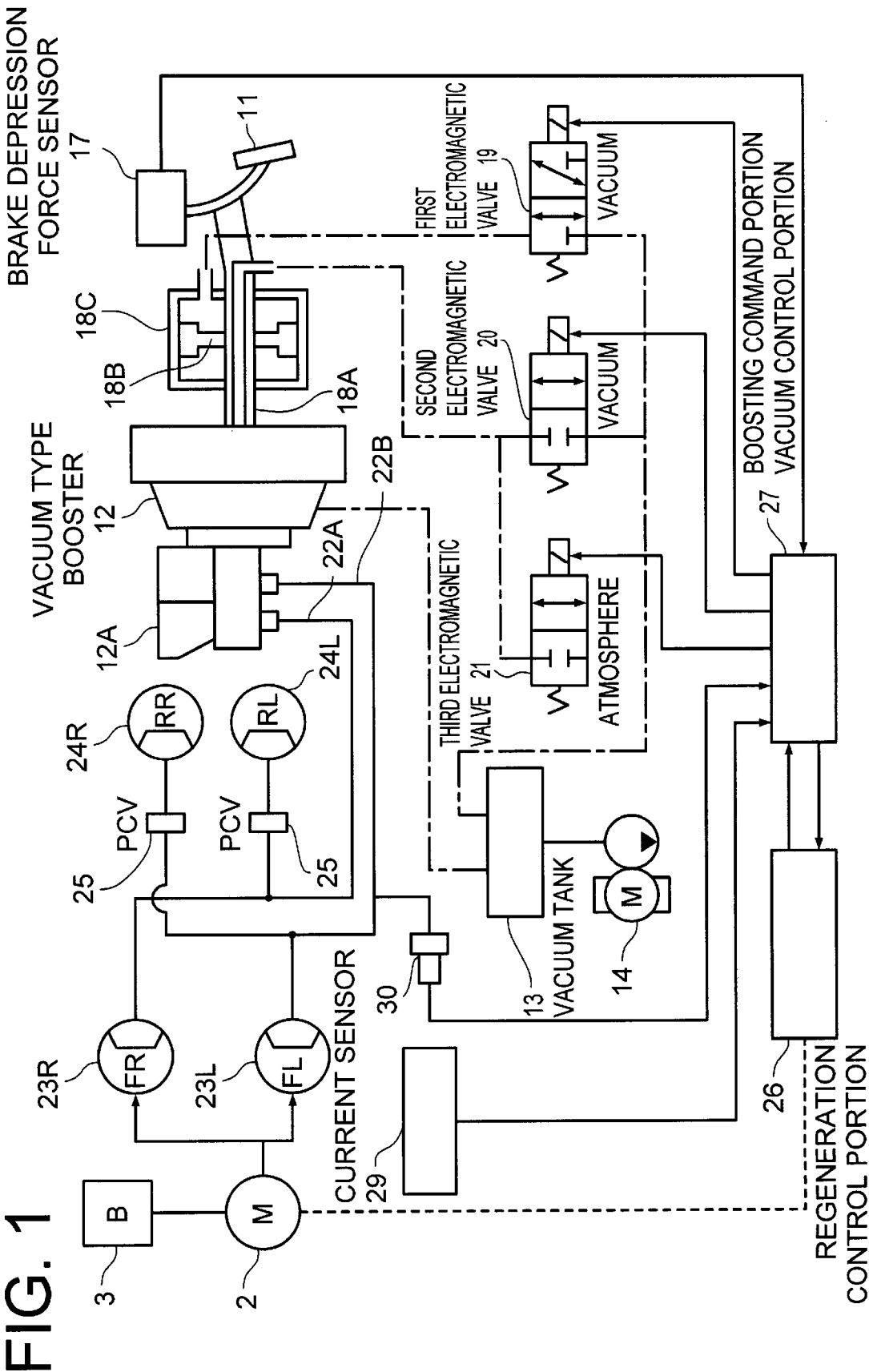
FIG. 1 is a control block diagram schematically showing the construction of a brake apparatus for an electric automobile utilizing regenerative braking as well as mechanical braking according to one embodiment of the present invention.
Figure 2:
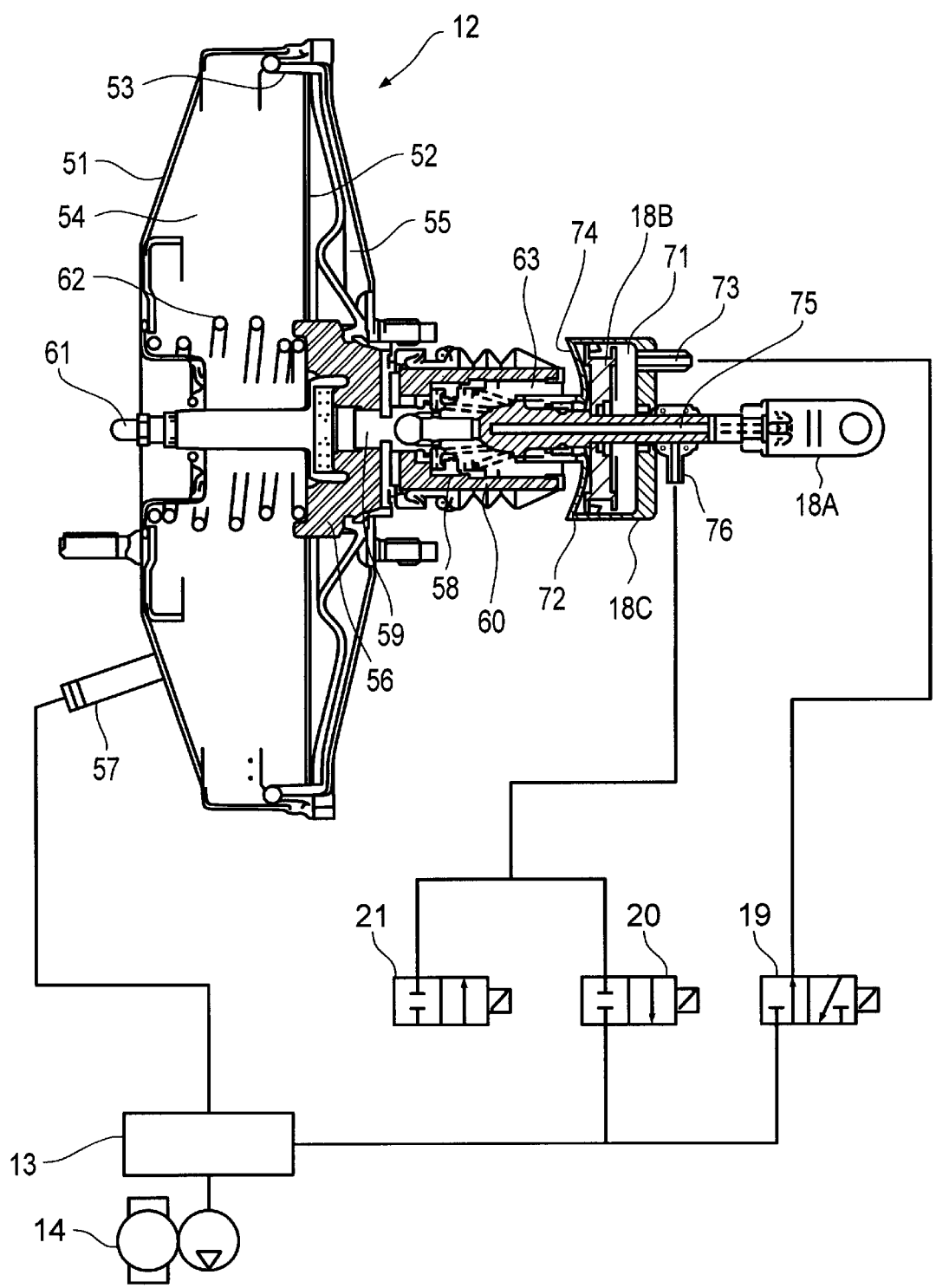
FIG. 2 is a cross sectional view showing a booster device employed in the brake apparatus for the electric automobile of the embodiment of FIG. 1.
Figure 5:
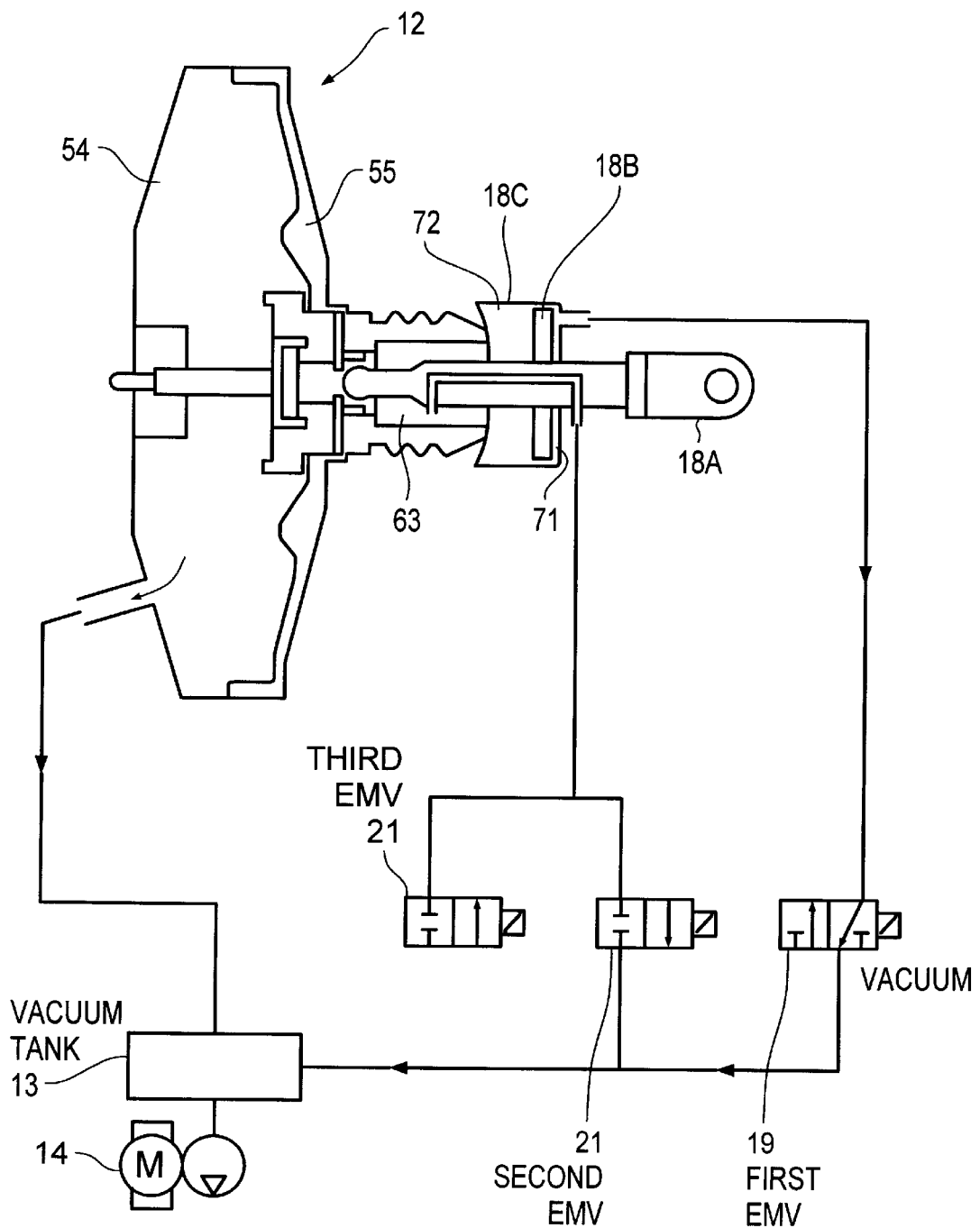
FIG. 5 is a view schematically showing a further form of control of the electromagnetic valves of the booster device in the present embodiment.
Figure 6:
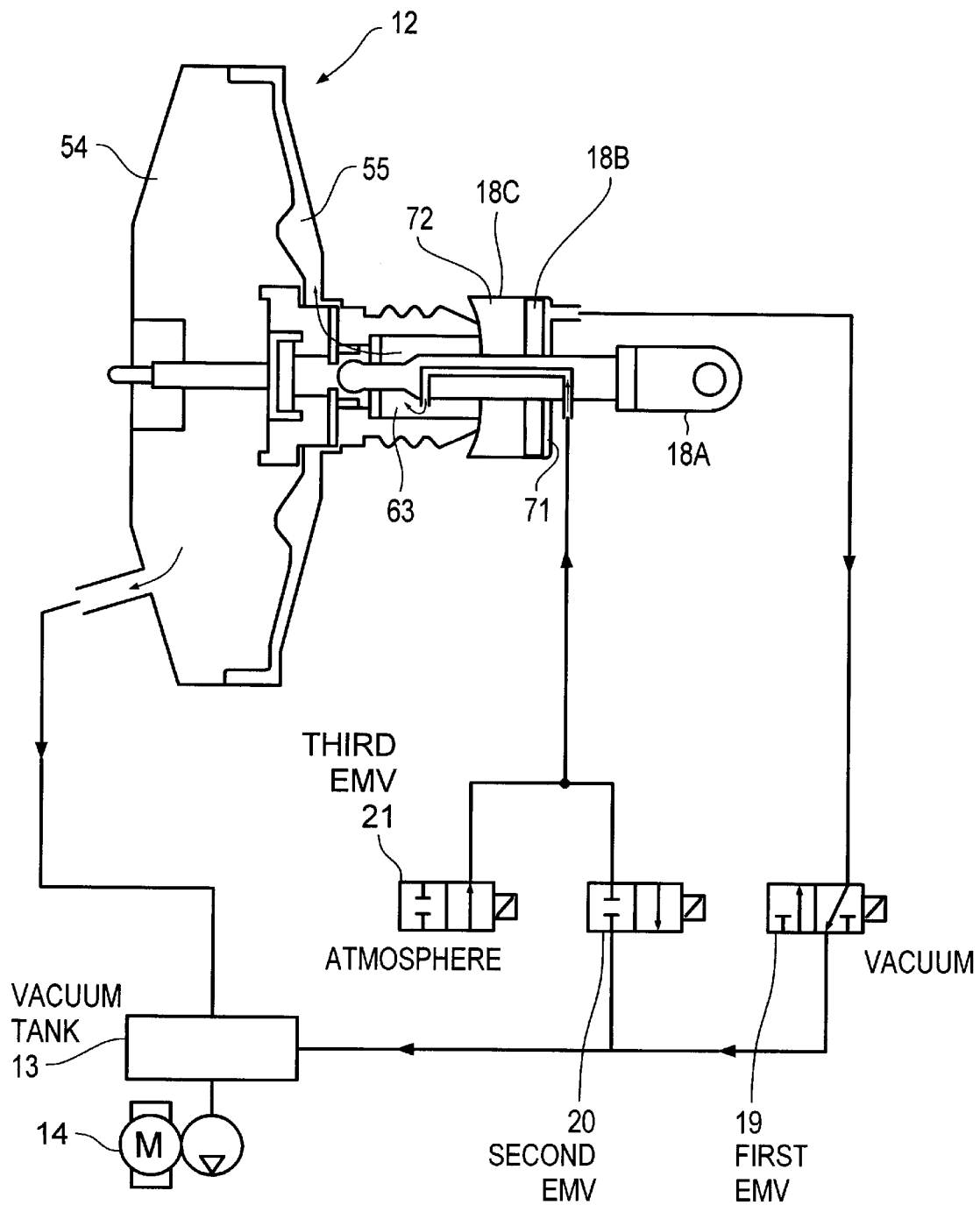
FIG. 6 is a view schematically showing a still further form of control of the electromagnetic valves of the booster device in the present embodiment.
Figure 7:
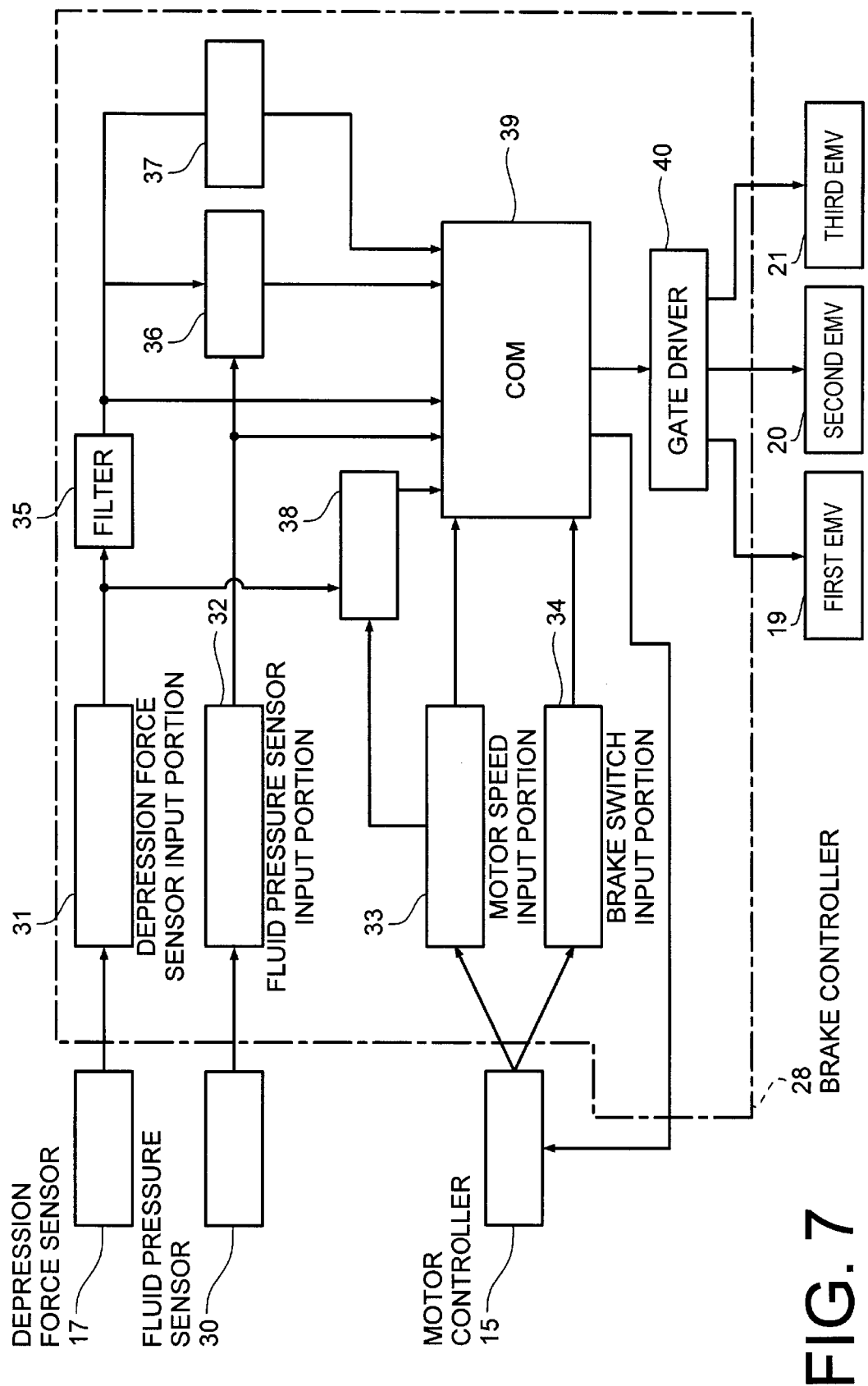
FIG. 7 is a control block diagram of the brake apparatus of the present embodiment.
Figure 8:
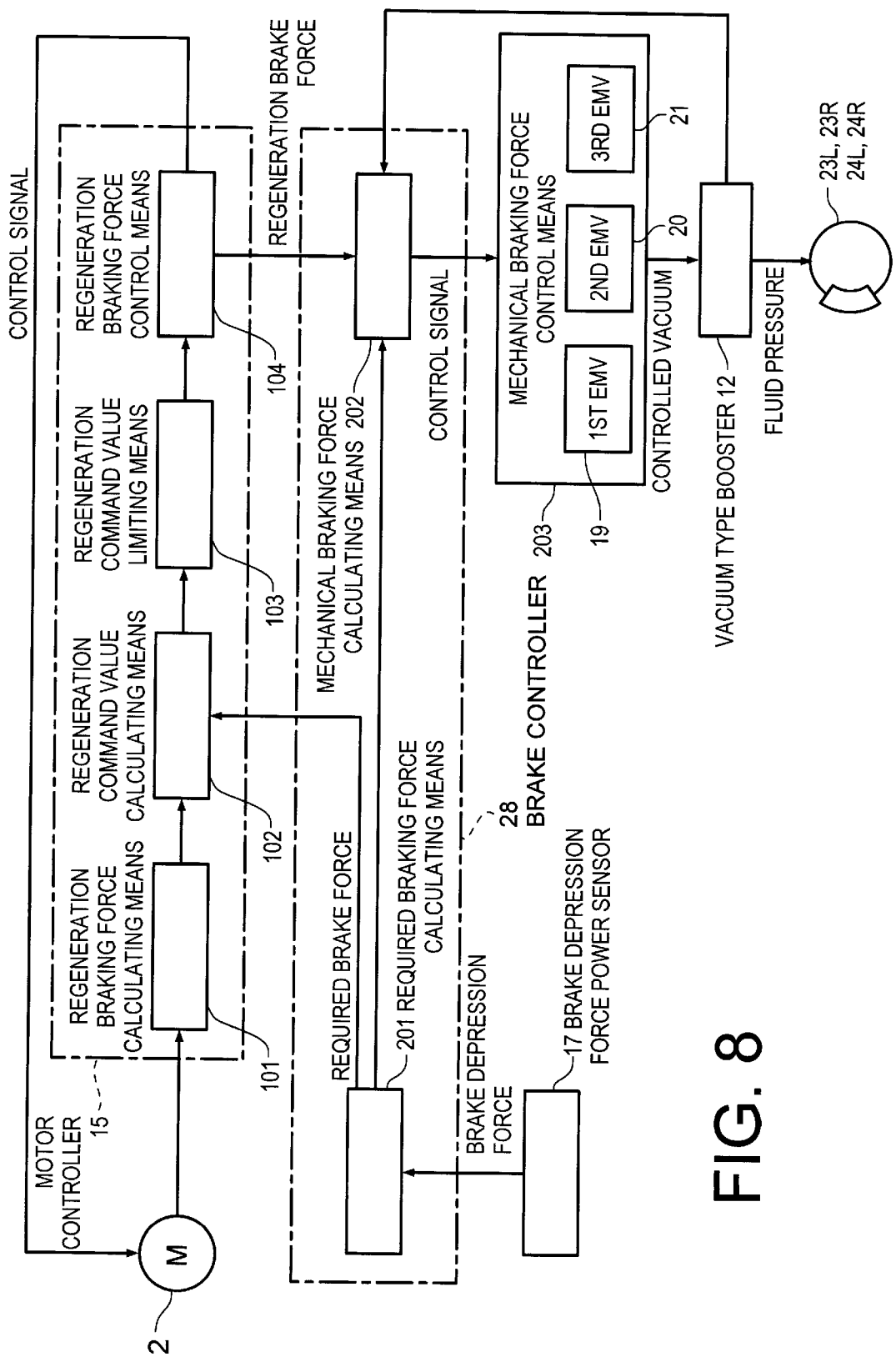
FIG. 8 is a block diagram showing processing for calculating the braking force of the brake apparatus of the present embodiment.
Figure 9:
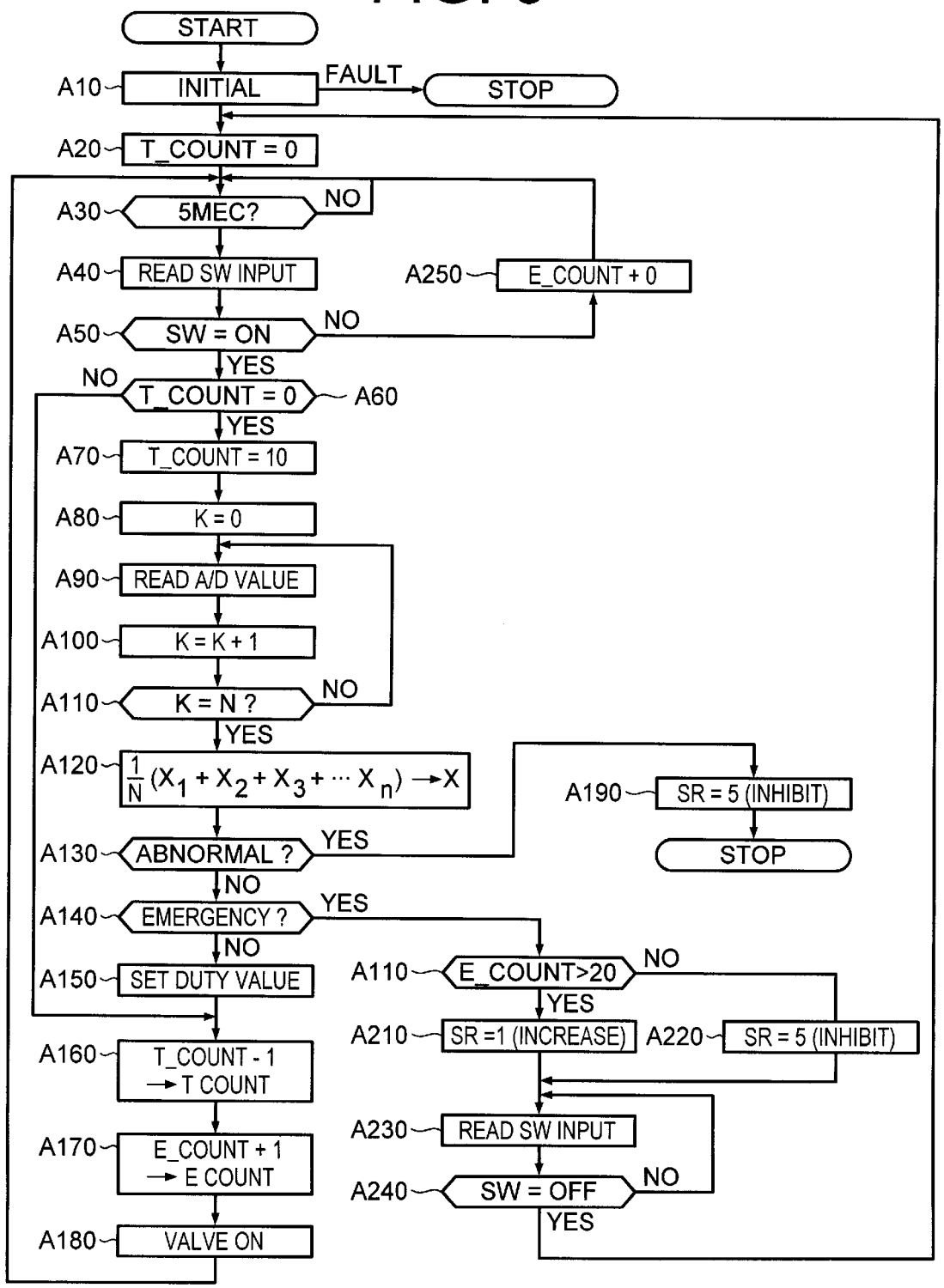
FIG. 9 is a main flow chart showing a braking force control routine implemented by the brake apparatus of the present embodiment.
Figure 10:
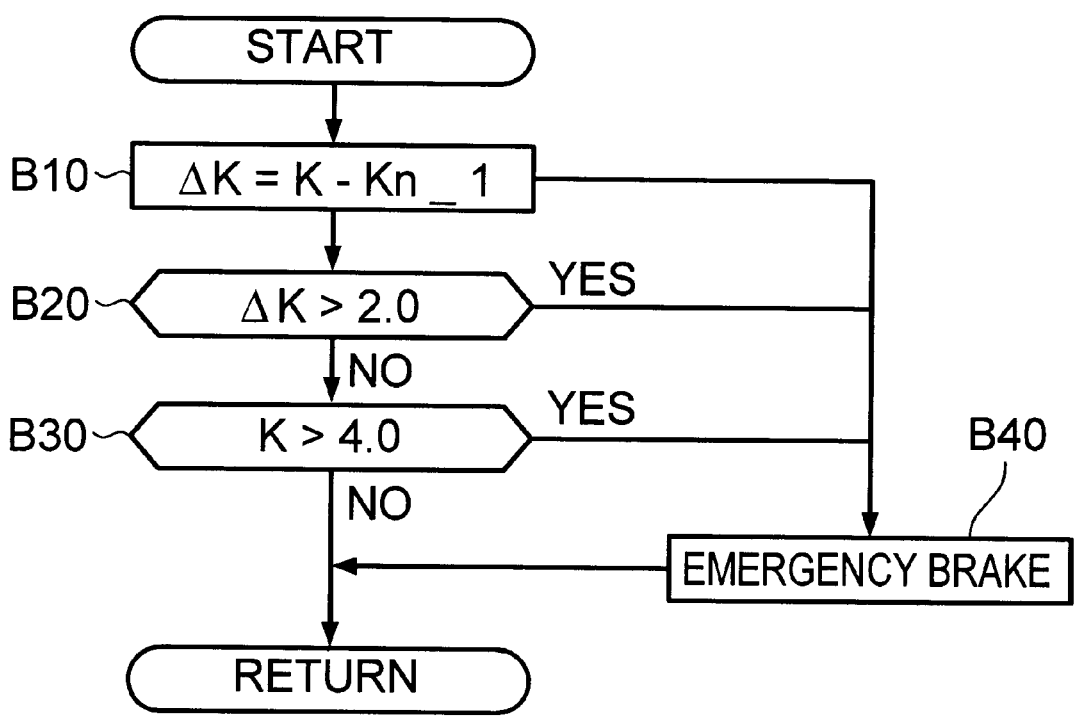
FIG. 10 is a flow chart showing a control subroutine for avoiding an emergent situation by the brake apparatus of the present embodiment.
Figure 11:
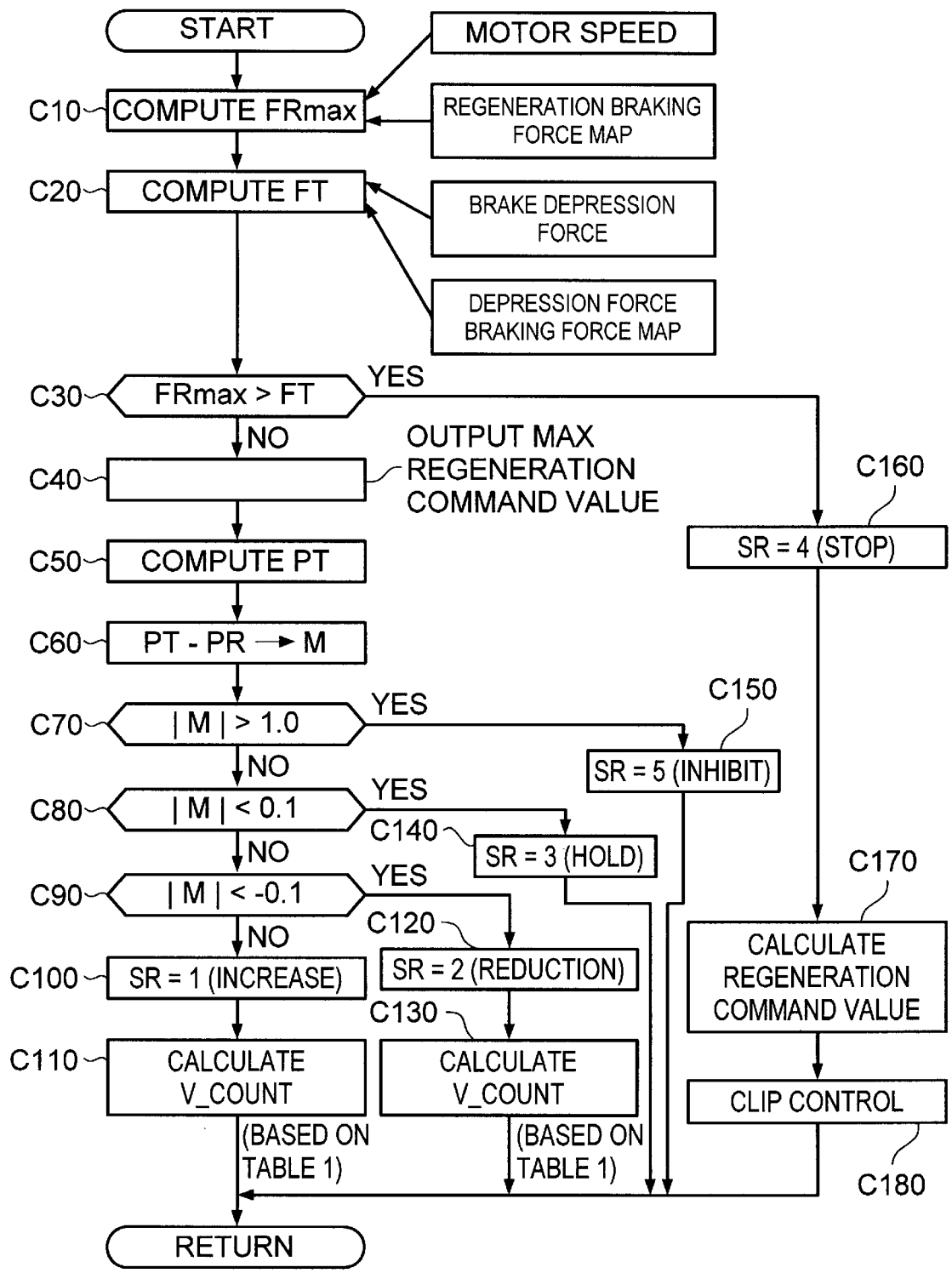
FIG. 11 is a flow chart showing a control subroutine for determining duty value of the electromagnetic valves of the brake apparatus of the present embodiment.
Figure 16:
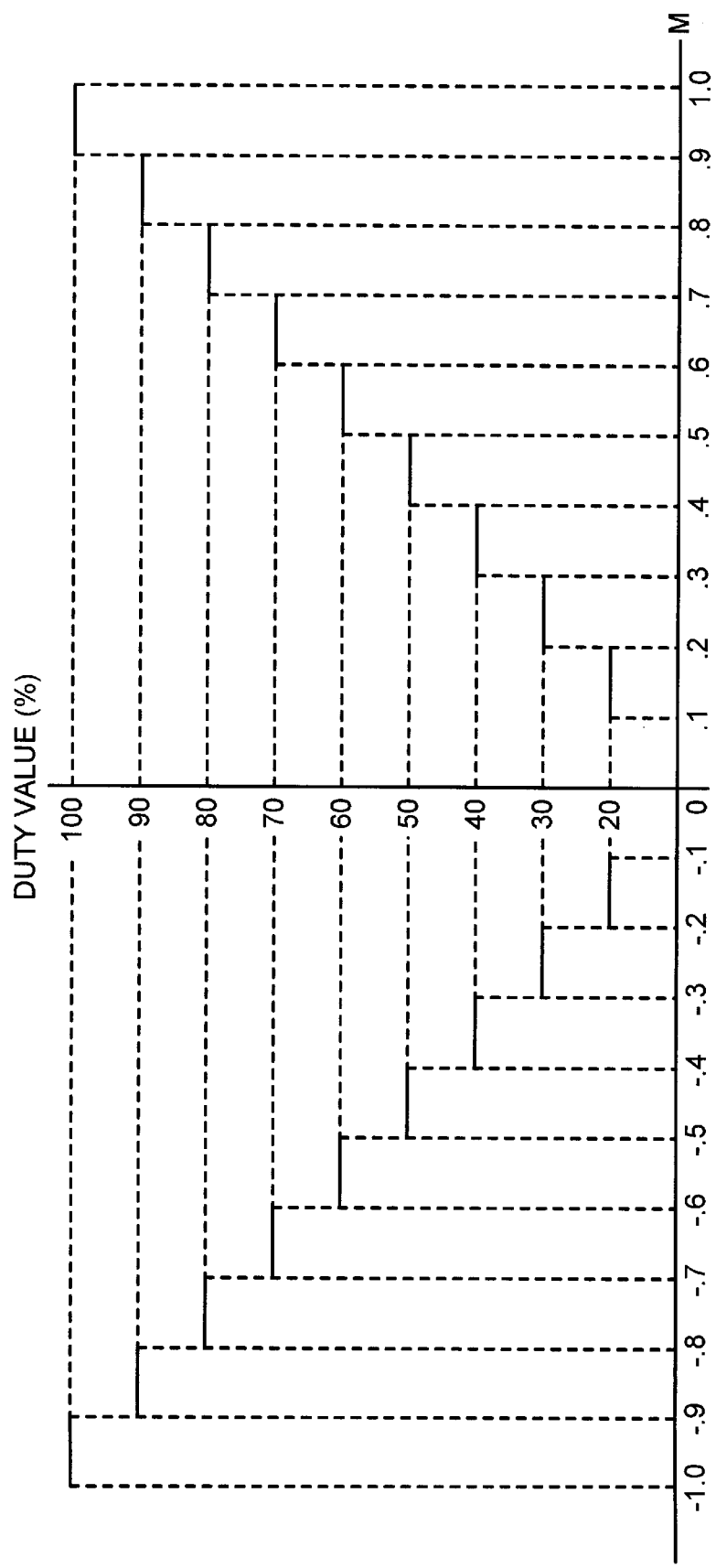
FIG. 16 is a graph showing characteristics for setting the duty value of the electromagnetic valves of the booster device of the present embodiment.
Figure 17:
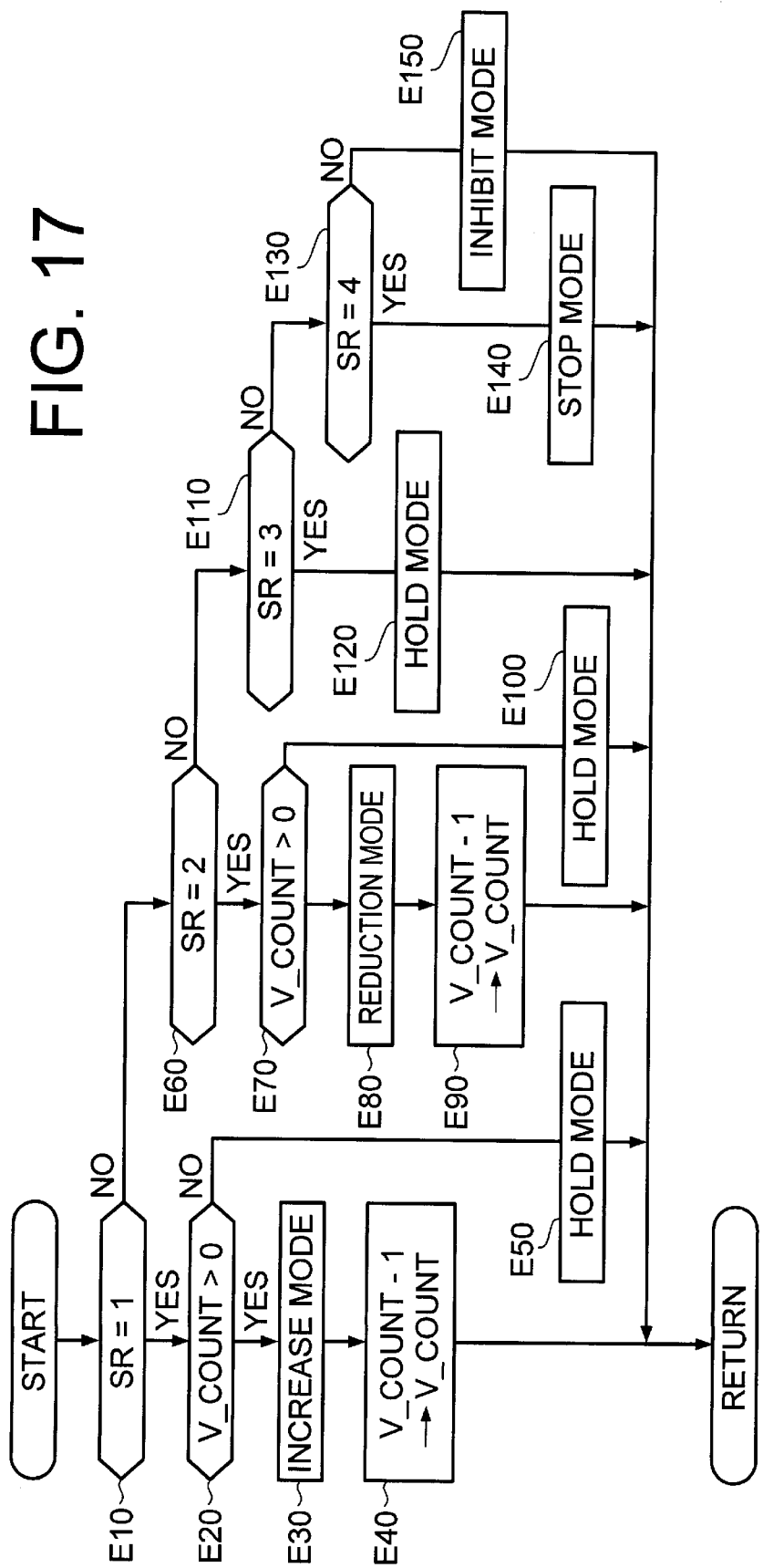
FIG. 17 is a flow chart showing control processing for driving the electromagnetic valves of the booster device of the present embodiment.
Figure 19:
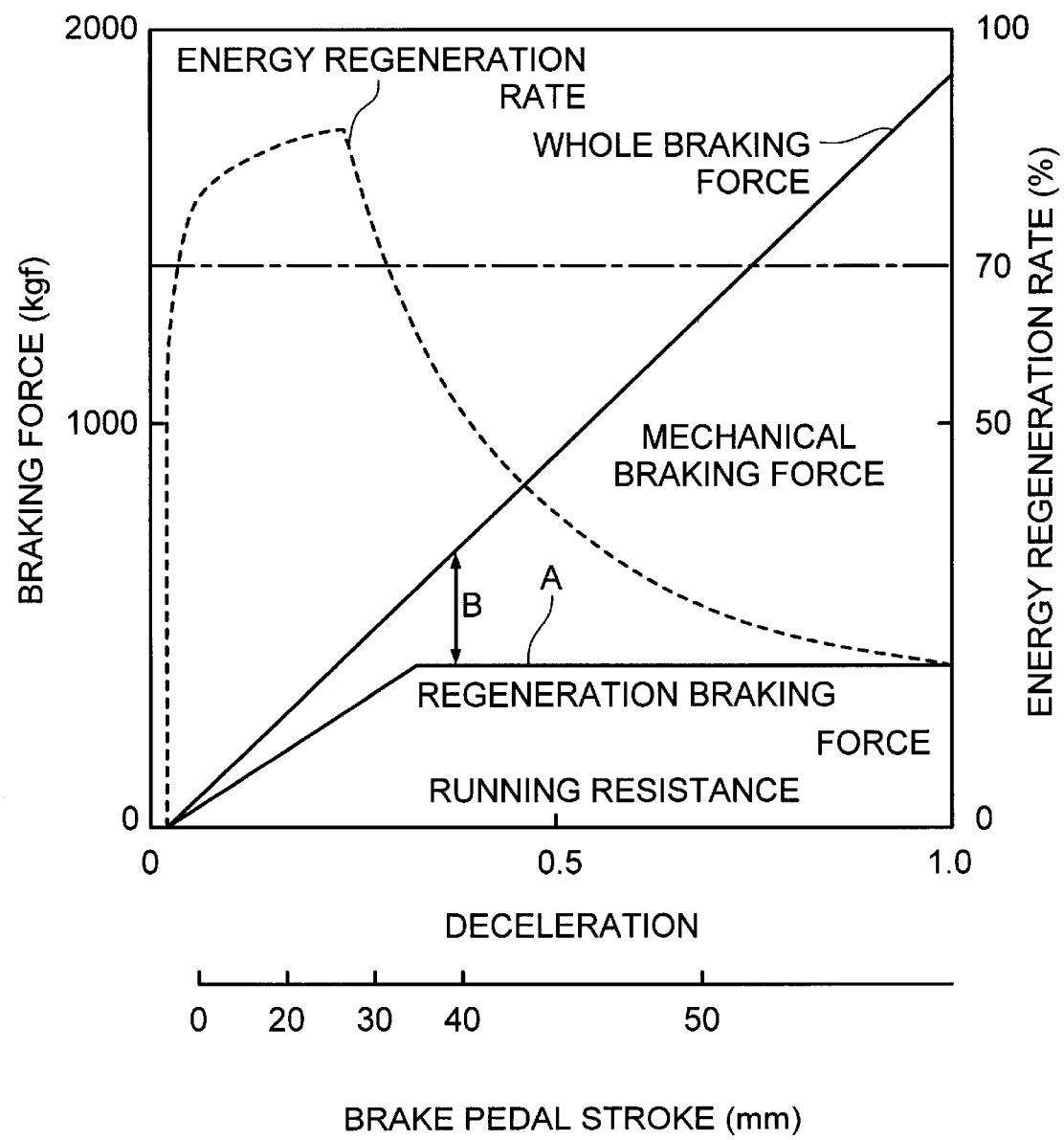
FIG. 19 is a graph showing braking force characteristics of the brake apparatus utilizing regenerative braking of the present embodiment.
Figure 20:
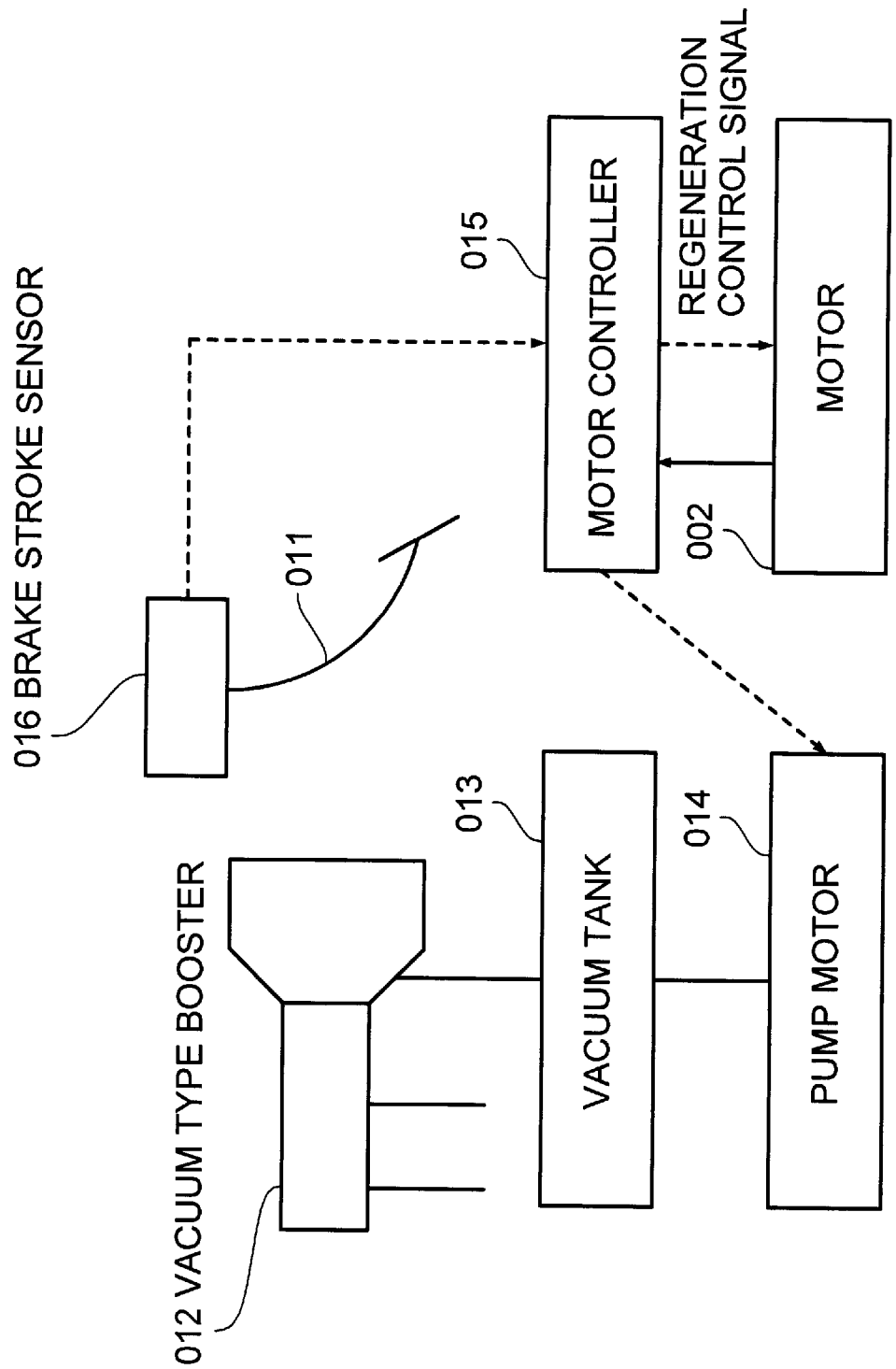
FIG. 20 is a view schematically showing the construction of a conventional brake apparatus for an electric automobile, which utilizes regenerative braking as well as mechanical braking.
Figure 22A:
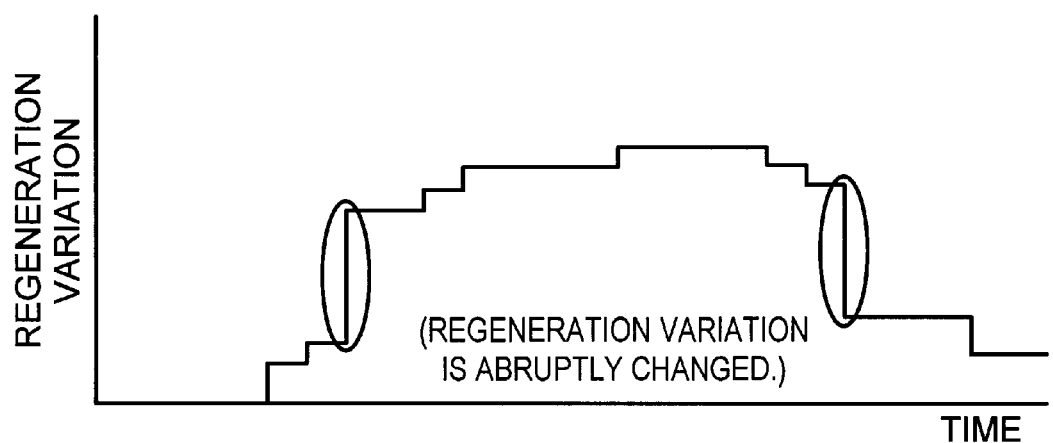
FIGS. 22(a) and 22(b) are graphs showing changes in a variation of the regenerative braking force of the conventional brake apparatus for the electric automobile.
Figure 22B:
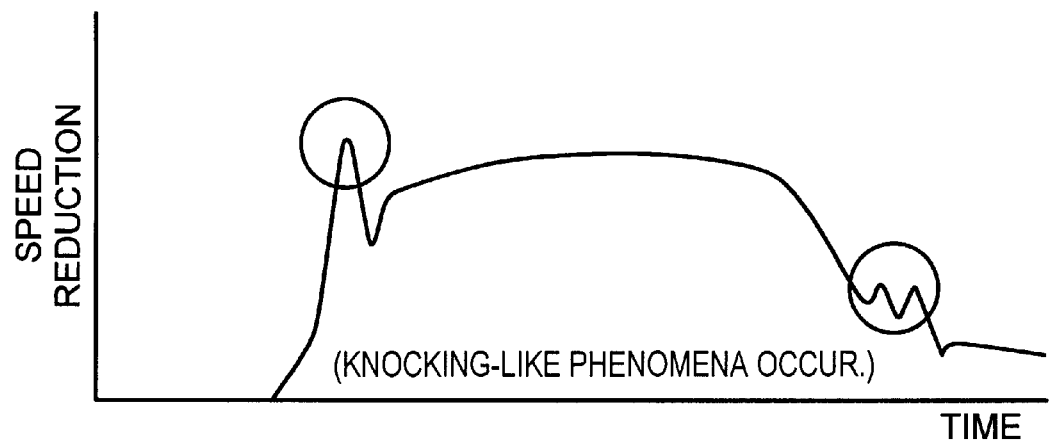

There will be described one preferred embodiment of the present invention referring to the accompanying drawings. FIG. 1 is a block diagram schematically showing the construction of a brake apparatus for an electric automobile utilizing regenerative braking as well as mechanical braking according to one embodiment of the present invention. FIG. 2 is a cross sectional view showing a booster device of the brake apparatus of the present embodiment. FIG. 3 through FIG. 6 are views schematically showing control of electromagnetic valves of the booster device in the present brake apparatus. FIG. 7 is a block diagram showing a control system of the brake apparatus. FIG. 8 is a control block diagram explaining processing for calculating braking force of the brake apparatus. FIG. 9 is a main flow chart showing a braking force control routine implemented by the present brake apparatus. FIG. 10 is a flow chart showing a control subroutine for avoiding an emergent situation by the brake apparatus. FIG. 11 is a flow chart showing a control subroutine for determining duty values of the electromagnetic valves of the brake apparatus. FIG. 12 is a flow chart showing control for limiting a regeneration command value in the brake apparatus. FIG. 13 is a graph showing limit command values that vary with the rotation speed of the motor. FIG. 14 is a graph showing changes in the regeneration variation controlled by the limit command value. FIG. 15 is a table related to the duty values of the electromagnetic valves of the brake apparatus. FIG. 16 is a graph showing characteristics for setting the duty values of the electromagnetic valves of the brake apparatus. FIG. 17 is a flow chart showing drive control for the electromagnetic valves of the brake apparatus. FIG. 18 is a table showing contents of the drive control of the electromagnetic valves of the brake apparatus. FIG. 19 is a graph showing braking force characteristics of the brake apparatus.

The brake apparatus for the electric automobile of the present embodiment uses a regenerative brake system for generating regenerative braking force, as well as a mechanical brake system for generating mechanical braking force, so as to provide a required braking force by combining the regenerative braking force with the mechanical braking force. In FIG. 1, reference numeral 11 denotes a brake pedal of the vehicle, and 12 denotes a vacuum type booster (vacuum servo assisted master cylinder) of the mechanical brake system. The vacuum booster 12 is actuated according to a degree or depth of depression of the brake pedal 11. Vacuum tank 13 for supplying vacuum is connected to the vacuum type booster 12, and the vacuum tank 13 is equipped with a pump motor 14 for reducing the pressure in the vacuum tank 13.

In this mechanical brake system, brake operating force (depression force) generated from the vacuum type booster 012 is converted into a brake fluid pressure in the master cylinder 12A, and the brake fluid pressure is applied to brake actuating members (e.g., brake calipers) 23L, 23R, 24L, 24R of respective vehicle wheels, through brake fluid pipes 22A, 22B, so that the brake actuating members 23L, 23R, 24L, 24R are actuated to apply the mechanical brake force to the drive wheels. Proportioning valves (PCV) 25 are disposed in the brake fluid pipes 22A, 22B on the side of rear wheels, so that the mechanical braking force applied to the rear wheels is reduced to a smaller value as compared to that applied to front wheels, to thereby prevent locking of the rear wheels to assure a stable vehicle posture upon braking.

In the vacuum type booster 12, a vacuum control cylinder 18C, which incorporates a vacuum control piston 18B such that the piston 18B is slidable relative to the cylinder 18C, is mounted on the operating rod 18A such that the cylinder 18C is axially movable relative to the rod 18A. The vacuum control piston 18B is fixed to the operating rod 18A. A first electromagnetic valve 19, a second electromagnetic valve 20, and a third electromagnetic valve 21, which are adapted to control the boosting ratio of the vacuum type booster 12 are connected to the vacuum type booster 12.

A regeneration control unit 26 for controlling regenerative braking is provided as one functional element of a motor controller 15 (FIG. 7) which will be described later. This regenerative control unit 26 generates a regeneration command to a motor 2 used for running the vehicle to switch the motor 2 to the power-generating state. As a result, a load (i.e., braking force) is applied to the drive wheels, and rotary motion of the drive wheels is recovered as electric energy, which is in turn charged in a battery 3. Brake depression force sensor (or brake stroke sensor) 17 is provided for detecting a degree of depression of the brake pedal 11. Upon depression of the brake pedal 11, the regeneration control unit 26 sets a regeneration command value, using a map (refer to braking force characteristic line A in FIG. 19) that is predetermined based on detected information from the brake depression force sensor 17, and performs regeneration control while feeding back the regenerating state of the motor 2 detected by a current sensor 29. To determine the regenerating state of the motor 2, the regeneration current of the motor 2 may be directly detected, or may be indirectly detected by detecting a torque current and an energizing current supplied from a motor controller 15, which will be described later, to the motor 2.

Booster command unit and vacuum control unit 27 receives depression force information from the brake depression force sensor 17, regeneration command information from the regeneration control unit 26, and regeneration current state of the motor 2 from the current sensor 29, and controls operating states of the above-indicated electromagnetic valves 19, 20, 21, based on the received information and current state.

The above-described vacuum type booster 12 will be explained in greater detail by referring to FIG. 2. In the vacuum type booster 12, a booster piston 52 and a diaphragm 53 are provided in a booster shell 51 adapted to actuate the master cylinder 12A, such that the interior of the booster shell 51 is divided into a front shell chamber (vacuum chamber) 54, and a rear shell chamber (control chamber) 55. Valve sleeve 56 is secured to a central portion of the booster piston 52 such that the valve sleeve 56 is slidably supported at a central portion of the booster shell 51. To the front shell chamber 54 of the booster shell 51 is connected a vacuum inlet pipe 57 that is connected to the above-indicated vacuum tank 13.

The operating rod 18A connected to the brake pedal 11 and a control valve 59 controlled by this operating rod 18A are provided at one end portion of the valve sleeve 56, and a valve piston 59 is slidably fitted in the center bore of the valve sleeve 56. The front end portion of the operating rod 18A is connected to the rear end portion of the valve piston 59, such that the rod 18A is radially movable relative to the valve piston 59. Further, a return spring 60 is interposed between the operating rod 18A and the control valve 58. On the other hand, an output rod 61 is attached to the front end portion of the valve sleeve 56, and the distal end of the output rod 61 is connected to a piston (not shown) of the master cylinder 12A. Between the valve sleeve 56 and the booster shell 62, there is interposed a return spring 62 for biasing the booster piston 52 backwards to return the valve sleeve 56. With the return spring 62 thus provided, the booster piston 52 is always located at the rearmost position where no pressure difference arises between the front shell chamber 54 and the rear shell chamber 55.

If the brake pedal 11 is depressed to advance the operating rod 18A, the valve piston 59 moves forward to thereby release the control valve 58, so that an opening 63 of the valve sleeve 56 communicates with the rear shell chamber 55, and the air flows into the rear shell chamber 55 through the opening 63. As the operating rod 18A is further advanced, the pushing force of the valve piston 59 is directly transmitted to the output rod 61.

In the meantime, the interior of the vacuum control cylinder 18C that is movable relative to the operating rod 18A is divided by the vacuum control piston 18B into an air chamber 71 and an atmospheric pressure chamber 72. The vacuum tank 13 is connected to a cylinder control port 73 of the air chamber 73, through the first electromagnetic valve 19, so that the vacuum can be supplied to the air chamber 71. If the vacuum is introduced into the air chamber 71, the vacuum control cylinder 18C is moved forward (i.e., toward the booster, or to the left in the figure).

On the outside of the atmospheric pressure chamber 72, there is attached a flexible partition 74 capable of closing the opening 63 that leads to the rear shell chamber (control chamber) of the vacuum type booster 12. This partition 74 is adapted to close the opening 63 if the vacuum control cylinder 18C moves forward, and let the opening 63 open if the cylinder 18C moves backward. Further, an air passage 75, formed in the operating rod 18A, communicates at its one end with the rear shell chamber 55, and at the other end with a booster power control port 76. While the opening 63 is closed by the partition 74, the boosting state of the vacuum type booster 12 is controlled according to the air pressure supplied from the booster power control port 76 into the rear shell chamber 55 through the air passage 75. While the opening 63 is released open, the rear shell chamber 55 is held at the atmospheric pressure, and the vacuum type booster 12 performs its normal boosting operation. The vacuum can be supplied from the vacuum tank 13 to the booster power control port 76 through the second electromagnetic valve 20, and the atmospheric pressure can be supplied to the same port 76 through the third electromagnetic valve 21. In the present embodiment, the air pressure in the rear shell chamber 55 is regulated by controlling duty cycles of the second and third electromagnetic valves 20, 21, so as to change the boosting condition of the vacuum type booster 12.

Figure 3:
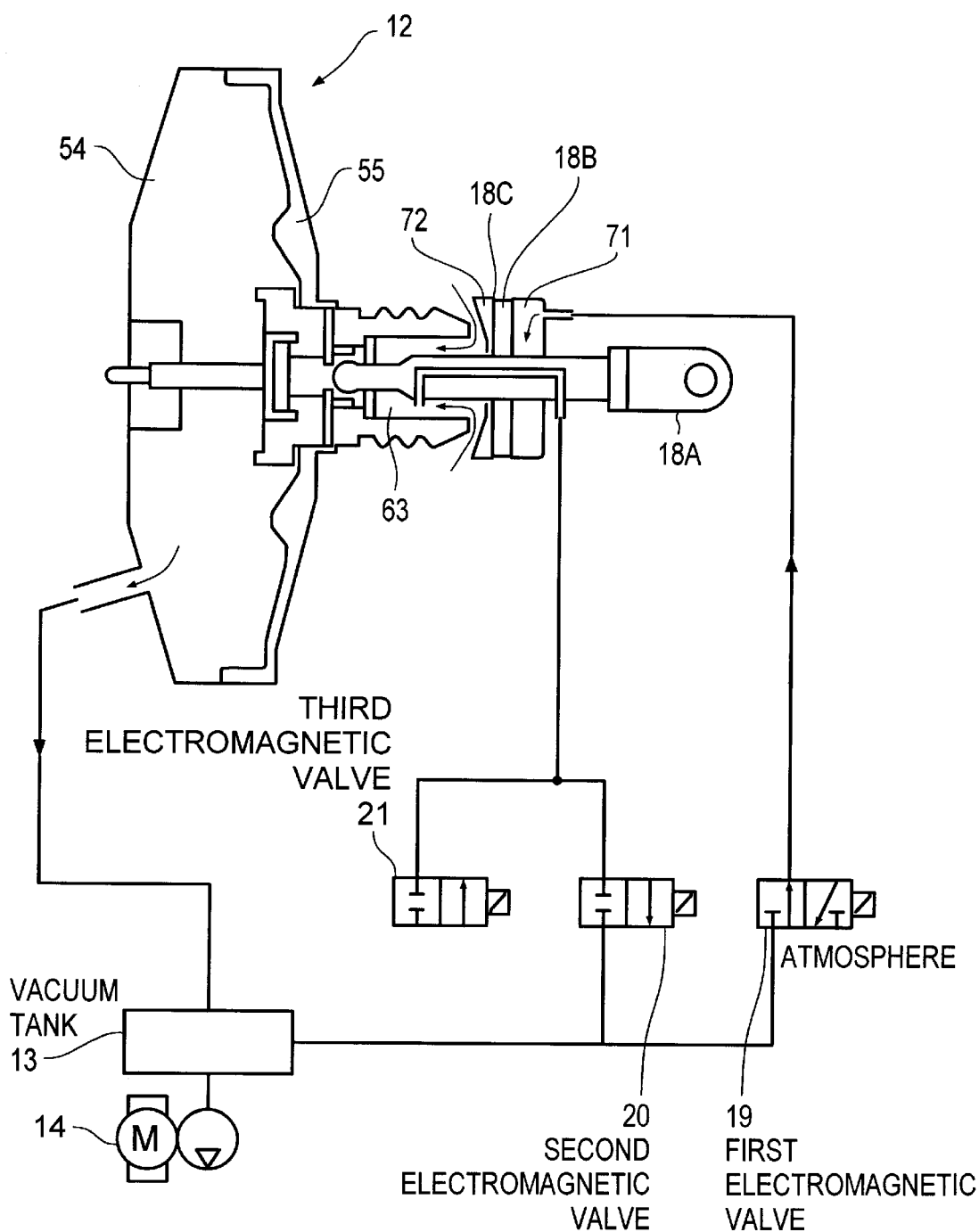
FIG. 3 is a view schematically showing one form of control of electromagnetic valves of the booster device in the present embodiment.

The control mode for the above three electromagnetic valves 19, 20, 21 is established by the booster command unit and vacuum control unit 27. This control mode is selected from pressure increase mode, pressure reduction mode, hold mode, stop mode and inhibiting mode, as shown in FIG. 18. The inhibiting mode is selected when the brake is not operated or is abruptly applied, for example. In this inhibiting mode, all of the electromagnetic valves 19, 20, 21 are placed in OFF states and closed, as shown in FIG. 3. In the vacuum type booster 12, therefore, the front shell chamber (vacuum chamber) 54 is evacuated by the vacuum tank 13, and the rear shell chamber (control chamber) 55 is held at vacuum or atmospheric pressure, depending upon a movement of the operating rod 18A due to depression of the brake pedal 11, and the opening 63 is held at the atmospheric pressure.

Figure 4:
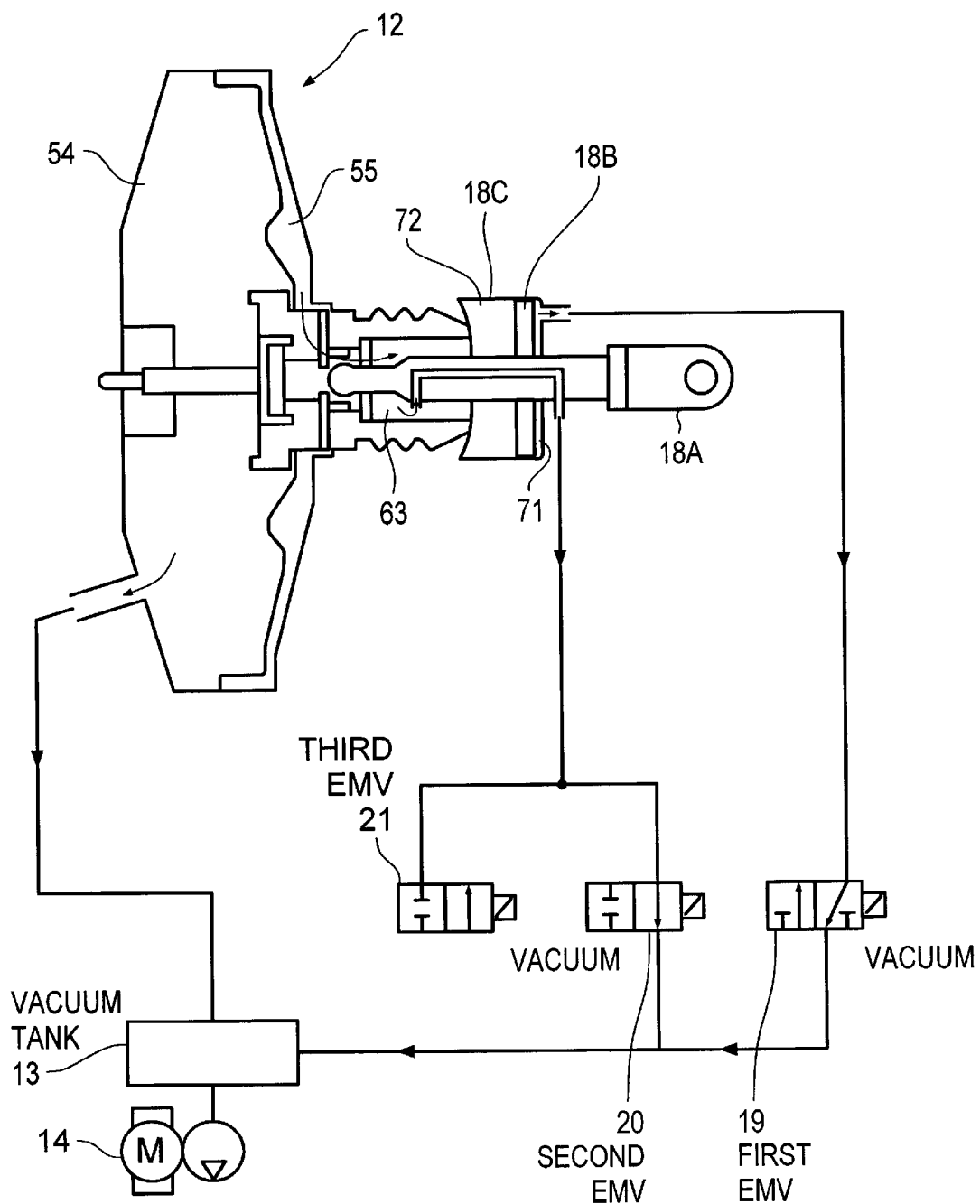
FIG. 4 is a view schematically showing another form of control of the electromagnetic valves of the booster device in the present embodiment.

The pressure reduction mode and stop mode are selected when the brake pedal 11 that has been depressed returns to its non-operated position, for example. In these pressure reduction mode and stop mode, the first and second electromagnetic valves 19, 20 are placed in the ON states, and the third electromagnetic valve 21 is placed in the OFF state, as shown in FIG. 4. In the vacuum type booster 12, therefore, the front shell chamber 54 is evacuated by the vacuum tank 13, and the vacuum control cylinder 18C is moved to close the opening 63 with the partition 74, so that the pressure in the rear shell chamber 55 is reduced.

The hold mode is selected when the regenerative braking is effected, for example. In this hold mode, only the first electromagnetic valve 19 is placed in the ON state, and the second and third electromagnetic valves 20, 21 are placed in the OFF states, as shown in FIG. 5. In the vacuum type booster 12, therefore, the front shell chamber 54 is evacuated by the vacuum tank 13, and the vacuum control cylinder 18C is moved to close the opening 63 with the partition 74, so that the pressure in the opening 63 and rear shell chamber 55 is held at a pressure that is regulated according to the amount of movement of the operating rod 18A due to depression of the brake pedal 11.

The pressure increase mode is selected when the brake pedal 11 is depressed, namely, the degree of depression of the pedal 11 is increased, for example. In this pressure increase mode, the first electromagnetic valve 19 is placed in the ON state, and the second electromagnetic valve 20 is placed in the OFF state, while the third electromagnetic valve 21 is placed in the ON state, as shown in FIG. 6. In the vacuum type booster 12, therefore, the front shell chamber 54 is evacuated by the vacuum tank 13, and the vacuum control cylinder 18C is moved to close the opening 63 with the partition 73, so that the pressure in the opening 63 and rear shell chamber 55 is increased closer to the atmospheric pressure.

There will be now described the brake control system of the brake apparatus of the present embodiment. As shown in FIG. 7, the brake controller 28 includes a depression force sensor input unit 31 that receives from the brake depression force sensor 17 a depression force signal representing the force with which the brake pedal 11 is depressed, and a fluid pressure sensor input unit 32 that receives a brake fluid pressure signal from a fluid pressure sensor 30. The brake controller 28 further includes a motor speed input unit 33 that detects the rotation speed of the motor 2 based on pulse signals received from the motor controller 15 for controlling the motor 2, and a brake switch input unit 34 that detects the ON/OFF state of a brake switch based on a voltage received from the motor controller 15. The depression force sensor input portion 31 is connected at its output side to a filter 35 for stabilizing the depression force signal, and the depression force signal thus processed by the filter 35 is sent to an abnormality detecting unit 36, an emergency braking detecting unit 37, and a computer 39. The brake depression force signal picked up before processed by the filter 35 is sent to the computer 39 through an abnormality detecting unit 38, along with a motor speed signal from the motor speed input unit 33.

The signal from the fluid pressure sensor input unit 32 is also sent to the abnormality detecting portion 36, along with the depression force signal. The signals from the motor speed input unit 33 and brake switch input unit 34 are also sent to the computer 39. The abnormality detecting unit 36 serves to detect any abnormality of the vacuum type booster 12 by comparing the brake depression force with the brake fluid pressure, while the abnormality detecting unit 38 serves to detect an abnormality of the regenerative brake system by comparing the brake depression force before it is filtered, with the rotation speed of the motor 2. The emergency braking detecting unit 37 is adapted to determine whether braking should be effected to avoid an emergent situation, based on a variation in the brake depression force.

The computer 39 sets a regeneration command value for the motor 2 based on these input signals, and generates the command signal. This regeneration command signal in the form of a digital signal is converted into an analog signal by a digital/analog (D/A) converter (not shown), and fed to the motor controller 15. The computer 39 also outputs control signals to the three electromagnetic valves 19, 20, 21 through a gate driver 40, based on the above-described input signals.

There will be now explained processing of the motor controller 15 and brake controller 28 for calculating the braking force. As shown in FIG. 8, the motor controller 15 includes regenerative braking force calculating means 101, regeneration command value calculating means 102, regeneration command value limiting means 103 and regenerative braking force control means 104. On the other hand, the brake controller 28 includes required braking force calculating means 201 and mechanical braking force calculating means 202. Thus, the braking force required by the braking operation of the driver is divided into the regenerative braking force and the mechanical braking force.

The required braking force calculating means 201 of the brake controller 29 receives the depression force signal (force applied to the brake pedal) from the brake depression force sensor 17, calculates a required braking force based on this brake depression force, and generates the result to the regeneration command value calculating means 101 and mechanical brake force calculating means 202. The regenerative braking force calculating means 101 of the motor controller 15 calculates the maximum regenerative braking force based on the rotation speed of the motor 2, and the regeneration command value calculating means 102 calculates the regeneration command value to be fed to the motor 2, based on the maximum regenerative brake force and required brake force. The regeneration command value limiting means 103 adds or subtracts a variation limit amount to or from this regeneration command value when a variation in the regeneration command values per unit time exceeds the predetermined variation limit amount, and generates the result as the final regeneration command value. Thus, the regenerative braking force control means 104 controls the regenerative braking force (controls regenerative current) based on the regeneration command value calculated by the regeneration command value calculating means 102 or the regeneration command value thus limited by the regeneration command value limiting means 103. At the same time, the detected result of the rotation speed of the motor 2 is fed back to the respective controllers 15, 28.

The mechanical braking force calculating means 202 of the brake controller 28 calculates the mechanical braking force, based on the required braking force calculated by the required braking force calculating means 201 and the regenerative braking force (controlled regenerative current) controlled by the regenerative braking force control means 104 of the motor controller 15. According to the thus calculated mechanical braking force, duty control signals are fed to the respective electromagnetic valves 19, 20, 21 as the mechanical brake force control means 203, to control the boosting condition of the vacuum type booster 12, and the brake fluid pressure applied to the brake operating (actuating) members 23L, 23R, 24L, 24R is regulated according to the controlled boosting condition. At the same time, the brake fluid pressure applied to the brake actuating members is fed back to control the mechanical braking force.

In this arrangement, the mechanical braking force can be freely reduced, since the boosting condition of the vacuum type booster 12 can be controlled by controlling the duty cycles of the respective electromagnetic valves 19, 20, 21. While the mechanical braking force increases with an increase in the depression force applied to the brake pedal 11, the degree of the increase in the braking force can be reduced so as to reduce the effect of the mechanical braking. Accordingly, where the regenerative braking force is determined as indicated by a braking force characteristic line A shown in FIG. 19, and the mechanical braking force is set to a value B obtained by subtracting the regenerative braking force from the total braking force, the mechanical braking force B thus determined can be generated with high reliability.

Referring to the flow charts of FIGS. 9–12, there will be explained a manner of controlling an operation of the brake apparatus utilizing regenerating braking as well as mechanical braking according to the present embodiment. With the brake apparatus constructed as described above, the regenerative braking force is set to follow the characteristic line A shown in FIG. 19, while the braking force is adjusted by driving the electromagnetic valves 19, 20, 21 according to the flow chart of FIG. 12, for example.

As shown in FIG. 9, step A10 is first executed to initialize and also check the states of the electromagnetic valves 19, 20, 21. The control flow goes to step A20 if these valves 19, 20, 21 are in normal states (OK), and is terminated if any of the valves is in an abnormal state (FAULT). In step A20, the value T_count of a timing axis counter is initialized, namely, set to zero. Step A30 is then executed to effect a timer routine to determine whether a required period (5 msec in this embodiment) has elapsed, and step A40 is executed to read a brake switch (SW) that allows drive commands to be generated to the electromagnetic valves. The reading of the brake switch may be replaced by reading of a detected value from the brake depression force sensor 17.

In step A50, it is determined whether the brake switch is ON or not, that is, if the braking operation is being effected or not. If the switch is ON, the control flow goes to step A60. If the switch is OFF, step A250 is then executed to initialize or set the count value E_count, that is counted from the time when the brake begins to be operated, to zero. In step A60, it is determined whether the value of the timing axis counter T_count is an initial value, i.e., zero, and, if the counter valve T_count is zero, step A70 is then executed to set the counter value T_count to 10. In the next step A80, the number of retrieved output data K is made equal to zero, and step A90 is then executed to read A/D values (output values of respective sensors) at intervals of 5 msec. In step A100, the number of retrieved output data is incremented, and step A110 is then executed to determine whether the number K of the output data read in A90 is equal to a predetermined number N. Namely, if the number K of the retrieved output data is smaller than the number N in step A110, the above-described steps A90–A110 are repeatedly executed. When the number K of the retrieved output data becomes equal to the predetermined number N, step A120 is executed to add the retrieved sensor output data $X_1$, $X_2$, $X_3$ ... $X_n$, and divide the sum by the number N to obtain the average output value X used for subsequent controls.

Step A130 is then executed to determine whether any abnormality is present in the control system based on detected information from the abnormality detecting portions 36, 38. If an abnormality is present in the system, step A190 is then executed so that SR=5, which allows the inhibiting mode to be selected. If no abnormality is present, step A140 is then executed to determine whether an emergent situation to be avoided occurs or not. If it is determined that there is no emergent situation to be avoided, step A150 is then executed to determine duty values, followed by step A160 in which the counter value T_count is updated. Step A170 is then executed to update the counter value E_count that is counted from the time when the brake pedal 11 starts being depressed, and step A180 is executed to drive the respective electromagnetic valves 19, 20, 21.

If an emergent situation to be avoided occurs in step S140, step A200 is then executed to determine whether the counter value E_count is larger than 20 or not. If the counter value E_count is determined to be larger than 20 in this step A200, step A210 is then executed so that SR=1, which allows the pressure increase mode to be selected. If the counter value E_count is determined to be equal to or smaller than 20, step A220 is then executed so that SR=5, which allows the inhibiting mode to be selected. Then, step A230 is executed to read the brake switch (SW) that allows drive commands to be generated to the electromagnetic valves. If it is determined, in step A240, that the brake switch is OFF, the control flow returns to step A20.

There will be now described in detail the above-indicated step A140 for determining whether any emergent situation to be avoided occurs or not. As shown in FIG. 10, step B10 is first executed to calculate a difference ΔK between the A/D value K of the current output value of the brake depression force sensor 17 and the A/D value $K_{n-1}$ of the output value of the sensor 17 one sample cycle before ($\Delta K = K - K_{n-1}$), which difference is an amount of an increase in the output value of the brake depression force sensor 17. In step B20, it is determine whether the increased amount ΔK is equal to or larger than a predetermined value (2.0 in this embodiment), and, if the increased amount ΔK is equal to or larger than the predetermined value, step B40 is then executed to effect braking for avoiding the emergent situation. If the increased amount ΔK is smaller than the predetermined value, step B30 is then executed to determined whether the current output value K of the brake depression force sensor 17 itself is equal to or larger than a predetermined value (4.0 in this embodiment) or not. If it is determined in step B30 that the output value K is equal to or larger than the predetermined value, step B40 is executed to effect braking for avoiding the emergent situation. Namely, if the brake pedal 11 is rapidly depressed, or the amount of depression of the brake pedal 11 itself is sufficiently large, the braking for avoiding the emergent situation should be effected.

There will be described in detail the above-indicated step A150 for determining the duty value. As shown in FIG. 11, step C10 is executed to compute the maximum regenerative brake force FRmax based on the motor speed and a regenerative braking force map (refer to the characteristic line A of FIG. 19). Step S20 is then executed to compute the target braking force FT based on the output value of the brake depression force sensor 17 and a depression force braking force map. In step C30, it is determined whether the maximum regenerative braking force FRmax is larger than the target braking force FT. If it is determined in step C30 that the maximum regenerative braking force FRmax is larger than the target braking force FT, step C160 is then executed so that SR=4, which allows the stop mode to be selected. In step C170, the regeneration command value that corresponds to the target brake force FT is calculated, and in step C180, clipping control is performed on the thus obtained regeneration command value to set and output the resulting regeneration command value.

If the maximum regenerative braking force FRmax is not larger than the target braking force FT in step C30, the control flow goes to step C40 to set the regeneration command value according to the maximum regenerative braking force FRmax. Step C50 is then executed to compute the target brake fluid pressure PT, and step C60 is executed to calculate a difference M (=PT−PR) between the target brake fluid pressure PT and the actual fluid pressure (detected brake fluid pressure). In step C70, it is determined whether the magnitude (absolute value) of this difference M is larger than a first predetermined value (e.g., 1.0). If it is determined in step C70 that the magnitude of the difference M is larger than the first predetermined value, which means that a rapid increase in the brake fluid pressure is required, step C150 is executed so that SR=5, which allows the inhibiting mode to be selected.

If it is determined in step S70 that the magnitude of the difference M is equal to or smaller than the first predetermined value, step C80 is executed to determine whether the magnitude (absolute value) of the difference M is smaller than a second predetermined value (e.g., 0.1) that is smaller than the first predetermined value. If it is determined in step C80 that the magnitude of the difference M is smaller than the second predetermined value, which means that the brake fluid pressure is in the target range, step S140 is executed so that SR=3 to make the control stable, namely, the hold mode is selected to keep the brake fluid pressure at the current level.

If it is determined in step C80 that the magnitude of the difference M is not smaller than the second predetermined value, which means the magnitude of the difference M is between the second and first predetermined values, the pressure increase control or pressure reduction control is to be effected. In step C90, it is determined whether the difference M is smaller than a predetermined value (e.g., −0.1). If the difference M is smaller than the predetermined value (−0.1), the actual fluid pressure is determined to be excessive, and step C120 is executed to establish SR=2, namely, select the pressure reduction mode to reduce the brake fluid pressure. In the next step C130, a duty value V_count is calculated according to the value of the difference M, based on the table as shown in FIG. 15 and the map as shown in FIG. 16.

If the difference M is not smaller than the predetermined value (−0.1) in step S90, on the other hand, the actual fluid pressure is determined to be insufficient, and step S100 is executed so that SR=1, namely, the pressure increase mode is selected to increase the brake fluid pressure. In the next step C110, the duty value V-count is calculated according to the value of the difference M, based on the table as indicated in FIG. 15 and the map as indicated in FIG. 16.

While the duty value V_count set in C110 and C130 increases stepwise with an increase in the magnitude of the difference M as shown in the table of FIG. 15 and the map of FIG. 16, the duty value V_count may vary more subtly or roughly, that is, in smaller or larger steps, with respect to the difference M.

The clipping control of the regeneration command value in the above-indicated step C180 will be now explained in greater detail. As shown in FIG. 12, step D10 is initially executed to determine whether the rotation speed NE of the motor 2 for running the vehicle is equal to or larger than the first predetermined value NE1 (e.g., 2500 rpm). If the motor speed NE is equal to or larger than the first predetermined value NE1 in step D10, this means that the motor 2 is rotating at a high speed, and the control flow goes to step D20, in which a CLIP value as the upper limit value of the variation of the regeneration command value is set to V1 (clip voltage, e.g., 0.06 V). If the motor speed NE is smaller than the first predetermined value NE1 in step D10, step D100 is then executed to determine whether the rotation speed NE of the motor 2 is equal to or larger than the second predetermined value NE2 (e.g., 1000 rpm). If the motor speed NE is equal to or larger than the second predetermined value NE2 in step D100, which means that the motor 2 is rotating at a middle speed, the control flow goes to step D110, in which the CLIP value as the upper limit of the variation of the regeneration command value is set to V2 (clip voltage, e.g., 0.04 V). If the motor speed NE is smaller than the second predetermined value NE2 in step D100, on the other hand, which means that the motor 2 is rotating at a low speed, the control flow goes to step D120, in which the CLIP value as the upper limit of the variation of the regeneration command value is set to V3 (clip voltage, e.g., 0.06 V).

Once the CLIP value as the upper limit of the variation of the regeneration command value is set as described above, step D30 is executed to calculate the variation A of the actual regeneration command value, and step D40 is then executed to determine whether the variation A of the actual regeneration command value is a negative value, namely, whether the motor speed is currently increasing. If the variation A of the regeneration command value is not a negative value in step D40, which means that the motor speed is being reduced, step D50 is executed to compare the variation A of the regeneration command value with the CLIP value set in step D20, D110 or D120. If the variation A of the regeneration command value is equal to or larger than the CLIP value, step D60 is executed to subtract the CLIP value from the last command value, and output the result as the regeneration command value.

If the variation A of the actual regeneration command value is a negative value in step D40, which means that the motor speed is being increased, step D70 is then executed to calculate the variation B of the actual regeneration command value, and step D80 is executed to compare the variation B of the regeneration command value with the CLIP value set in D20, D110 or D120. If the variation B of the regeneration command value is equal to or larger than the CLIP value, step D90 is executed to add the CLIP value to the last command value and output the result as the regeneration command value. If the variation B of the regeneration command value is smaller than the CLIP value in step D80, the regeneration command value obtained in step C170 (FIG. 11) is outputted. If the variation A of the regeneration command value is smaller than the CLIP value in step D50, the control flow goes to step D70 to perform the same processing as described above.

In the clipping control of the regeneration command value as described above, when the variations A, B of the regeneration command values per unit time are equal to or larger than the CLIP value V1, V2, V3 that is set for each motor speed range as the upper limit of the variation of the regeneration command value, the regeneration command value obtained in the current control cycle is not employed, and the CLIP value V1, V2, V3 is added to or subtracted from the regeneration command value obtained in the last control cycle to thereby limit the regeneration command value.

Figure 13A:
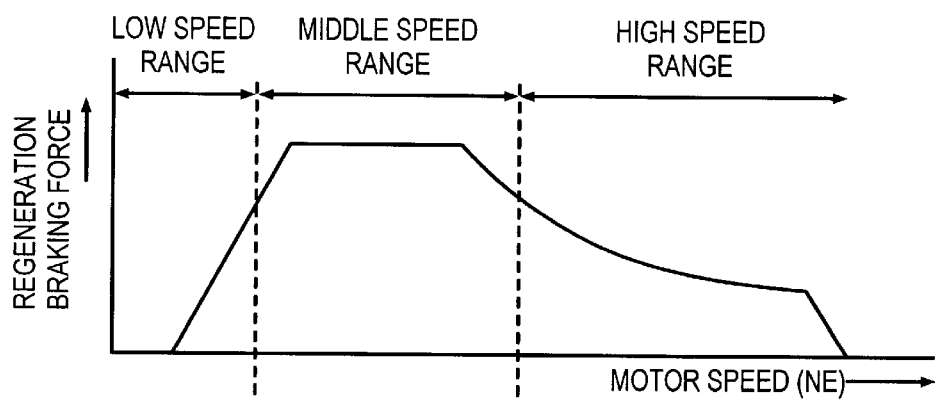
FIGS. 13(a) and 13(b) are graphs showing limit command values (variation limiting threshold values) that vary with a rotation speed of an electric motor.
Figure 13B:
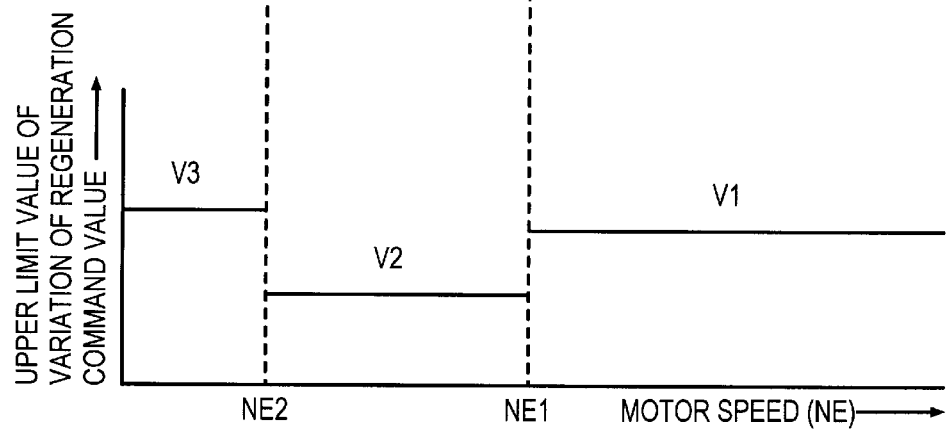

Namely, the maximum value of the regenerative braking force generated by the motor 2 is determined according to the motor speed. As shown in FIGS. 13(a) and 13(b), the maximum value of the regenerative braking force is relatively small while the motor speed is in the low or high range, and the variation of the braking force per unit time does not become large in the low and high motor speed ranges. While the motor speed is in the middle range, however, the maximum value of the regenerative braking force becomes a relatively large, and the variation of the braking force per unit time becomes large in this speed range. As a result, the braking force applied to the vehicle is rapidly changed, causing knocking phenomena that deteriorate brake feeling. Thus, in the present embodiment, the upper limit of the variation of the regenerative braking force is separately set for the respective low, middle and high ranges of the motor speed.

Figure 14A:
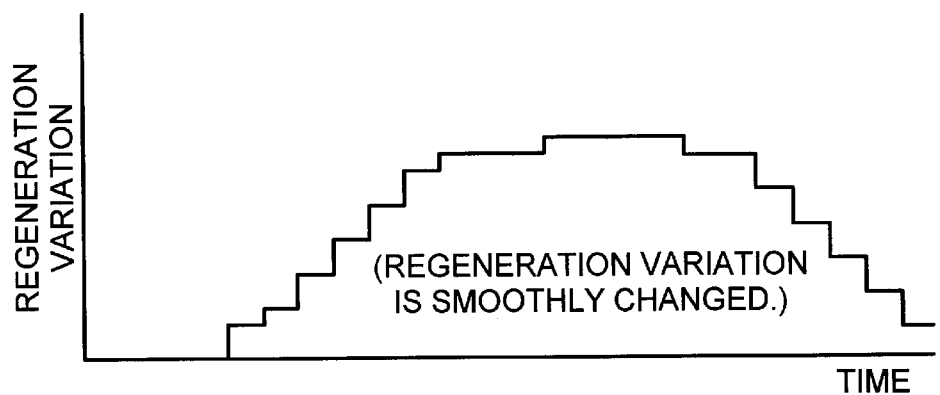
FIGS. 14(a) and 14(b) are graphs showing changes in the variation of the regenerative braking force when controlled by a regeneration command value compensated by a limiting command value (variation limiting threshold value)
Figure 14B:
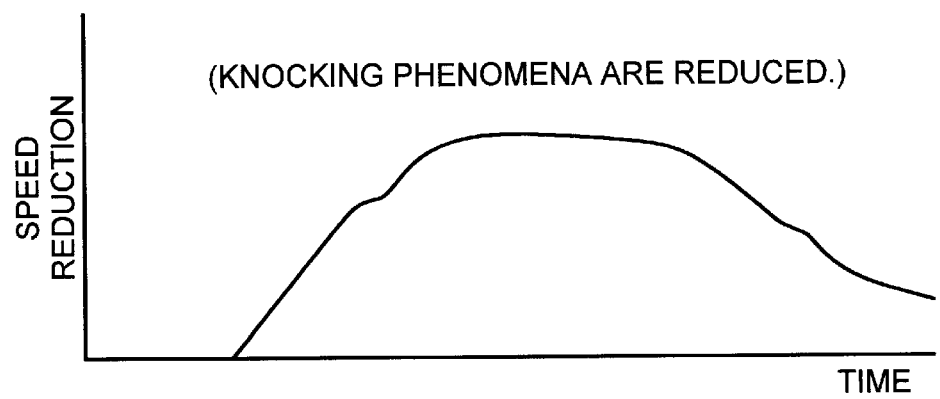

When the calculated regeneration command value exceeds this upper limit value, the regeneration command value is limited and then outputted. Therefore, the regeneration variation per unit time does not become excessively large, as shown in FIGS. 14(a) and 14(b), and the knocking phenomena are suppressed and the vehicle speed is smoothly reduced.

Once the duty value is determined in the above-described processing, the respective electromagnetic valves 19, 20, 21 are driven based on the duty value thus determined. More specifically, as described in FIG. 17, if SR=1, namely, the pressure increase mode may be selected in step E10, step E20 is then executed to determine whether the duty value V_count is positive or not. If the duty value V_count is positive, the pressure increase mode is established in step E30, and the count number of the duty value is reduced from V_count to the V_count−1 in step E40. If the duty value V-count is not positive in step E20, the hold mode is established in step E50.

If it is determined in step E10 and step E60 that SR=2, namely, the pressure reduction mode may be selected, step E70 is executed to determine whether the duty value V_count is positive or not. If the duty valve V_count is positive, the pressure reduction mode is established in step E80, and the count number of the duty value is reduced from V_count to V_count−1 in step E90. If the duty valve V_count is not positive in step E70, the hold mode is established in step E100.

Further, if it is determined in steps E10, E60 and E110 that SR=3, namely, the hold mode may be selected, the hold mode is established in step E120. If it is determined in step E10, 60, 110, 130 that SR=4, namely, the stop mode may be selected, the stop mode is established in step E140. If it is determined in step E10, 60, 110, 130 that SR=5, namely, the inhibiting mode may be selected, the inhibiting mode is established in step E140.

The electromagnetic valves 19, 20, 21 are suitably controlled in the manner, as described above, so that the ratio of the regenerative braking force to the total braking force is increased, so that the brake energy can be recovered as the electric energy with improved efficiency. It will be noted from FIG. 19 showing one example of a curve representing the energy recovery rate that the energy recovery rate is significantly improved as compared with the conventional example (FIG. 21), particularly when a relatively small depression force is applied to the brake pedal 11, and the braking energy as a whole can be efficiently recovered as the electric energy.

Consequently, the travel or cruising distance the electric automobile is able to run continuously per charging (external charging) can be greatly prolonged. According to a result of a simulation test based on a current amount (Ah), for example, the travel distance was expected to be prolonged by about 16%. According to a result of a test using an actual car, the traveling distance was expected to be prolonged by about 10%. Since the brake fluid pressure is controlled through the vacuum type booster 12, rather than directly controlling the brake fluid pressure itself, the brake control can be performed with a result of good brake feeling.

The present embodiment, as described above in detail, can yield the following effects and advantages.

The pneumatic pressure supplied to the booster device is controlled so that the electric energy can be recovered with improved efficiency due to the regenerating braking force, assuring improved brake feeling and safety.

When the mechanical braking force is determined by the braking force required by the driver and the maximum regenerative braking force based on the rotation speed of the electric motor, the variation in the command value of the maximum regenerative braking force is limited in a predetermined range corresponding to the motor speed, whereby vibrations of the electric motor due to changes in the regenerative braking force, variations of the mechanical braking force due to changes of the regenerative braking force, and rapid changes of control due to control delay or others can be avoided, assuring further improved braking feeling.

Although the invention has been described in detail with respect to a preferred embodiment thereof, it will be apparent to those skilled in the art that various modifications are possible without departing from the scope of the present invention.

What is claimed is:

1. A brake apparatus utilizing regenerative braking and mechanical braking, for use in an electric automobile having an electric motor driven by a battery installed in the automobile, comprising:

a mechanical brake system which includes a master cylinder for converting depression force applied to a brake pedal provided in said electric automobile into a first fluid pressure, through a booster device for amplifying said depression force by a second fluid pressure, and a brake actuating member for receiving said first fluid pressure generated by said master cylinder and applying a mechanical braking force to a vehicle wheel;

a regenerative braking force calculating unit which calculates a maximum regenerative braking force based on a detected rotation speed of said electric motor;

a regenerative brake system which generates a regenerative braking force in said electric motor, based on a result of calculation of said regenerative braking force calculating unit;

a brake pedal operation detecting unit which detects an operated state of said brake pedal;

a required braking force calculating unit which calculates a required braking force required by a driver based on said detected operated state of said brake pedal;

a target mechanical braking force calculating unit which calculates a target mechanical braking force to be generated by said mechanical brake system based on said required braking force calculated by said required braking force calculating unit and said maximum regenerative braking force calculated by said regenerative braking force calculating unit so that the target mechanical braking force is derived from the detected rotation speed of said electric motor; and a mechanical braking force control unit which controls the second fluid pressure applied to said booster device so that the fluid pressure generated by said master cylinder provides the target mechanical braking force calculated by said target mechanical braking force calculating unit.

2. A brake apparatus according to claim 1, wherein said mechanical braking force control unit controls the second fluid pressure applied to said booster device, according to a difference between the target mechanical braking force obtained by said target mechanical braking force calculating unit and an actual mechanical braking force actually generated by said mechanical brake system.

3. A brake apparatus according to claim 1, wherein said regenerative braking force calculating unit calculates said maximum regenerative braking force based on a control map representing a predetermined relationship between the maximum regenerative braking force and the rotation speed of said electric motor.

4. A brake apparatus according to claim 1, wherein a variation per unit time of a value corresponding to the maximum regenerative braking force obtained by said regenerative braking force calculating unit is compared with a predetermined variation limiting threshold value, and the maximum regenerative braking force is compensated based on said variation limiting threshold value to provide a compensated value to be supplied to said target mechanical braking force calculating unit when said variation exceeds said variation limiting threshold value, so that the target mechanical braking force calculating unit calculates the target mechanical braking force to be generated by said mechanical brake system, based on said required braking force calculated by said required braking force calculating unit and said compensated value of the maximum regenerative braking force.

5. A brake apparatus according to claim 1, further comprising:

a regeneration command value calculating unit which produces a regeneration command value to be fed to said electric motor based on the maximum regenerative braking force obtained by said regenerative braking force calculating unit; and a regenerative command value limiting unit which compares a variation per unit time of said regeneration command value produced by said regeneration command value calculating unit with a predetermined variation limiting threshold value, and outputting a regeneration command compensated value obtained by compensating the regenerative command value based on said variation limiting threshold value when said variation exceeds the variation limiting threshold value, while outputting said regenerating command value as it is as the regeneration command compensated value when said variation is not greater than said variation limiting threshold value; wherein said target mechanical braking force calculating unit calculates the target mechanical braking force to be generated by said mechanical brake system based on the required braking force calculated by said required braking force calculating unit, and said regeneration command compensated value outputted by said regeneration command value limiting unit.

6. A brake apparatus according to claim 5, wherein said regenerative command limiting unit adds or subtracts said variation limiting threshold value to or from said regeneration command value, depending upon a direction of the variation in the regenerative command value, when the variation per unit time in the regeneration command value obtained by said regeneration command value calculating unit exceeds said predetermined variation limiting threshold value.

7. A brake apparatus according to claim 5, wherein said variation limiting threshold value varies with the rotation speed of said electric motor.

8. A brake apparatus according to claim 6, wherein said variation limiting threshold value varies with the rotation speed of said electric motor.

9. A brake apparatus according to claim 1, wherein said depression force corresponds to an operating stroke amount of said brake pedal.

10. A brake apparatus according to claim 1, wherein said second fluid pressure is a pneumatic pressure.

11. A brake apparatus according to claim 8, wherein said depression force corresponds to an operating stroke amount of said brake pedal.

12. A brake apparatus according to claim 1, wherein said second fluid pressure is a vacuum pressure.

13. A brake apparatus utilizing regenerative braking and mechanical braking, for use in an electric automobile having an electric motor driven by a battery installed in the automobile, comprising:

a mechanical brake system which includes a master cylinder for converting depression force applied to a brake pedal provided in said electric automobile into a fluid pressure, and a brake actuating member for receiving said fluid pressure generated by said master cylinder and applying a mechanical braking force to a vehicle wheel of the automobile;

a regenerative braking force calculating unit which calculates a maximum regenerative braking force based on a rotation speed of said electric motor;

a regenerative brake system which generates a regenerative braking force in said electric motor based on a result of calculation of said regenerative braking force calculating unit;

a brake pedal operation detecting unit which detects an operated state of said brake pedal;

a required braking force calculating unit which calculates a required braking force required by a driver based on said operated state of said brake pedal detected by said brake pedal operation detecting unit;

a target mechanical braking force calculating unit which calculates a target mechanical braking force to be generated by said mechanical brake system based on said required braking force calculated by said required braking force calculating unit and a compensated value of said maximum regenerative braking force, said compensated value being obtained by compensating the maximum regenerative braking force calculated by said regenerative braking force calculating unit based on a predetermined variation limiting threshold value when a variation per unit time of a value that corresponds to the maximum regenerative braking force exceeds said predetermined variation limiting threshold value, said maximum regenerative braking force being outputted as it is as said compensated value when the maximum regenerative braking force is not greater than said predetermined variation limiting threshold value; and a mechanical braking force control unit which controls said mechanical brake system such that the fluid pressure generated by said master cylinder provides the target mechanical braking force calculated by said mechanical braking force calculating unit.

* * * * *